US012510093B1

(12) United States Patent
Ali

(10) Patent No.: US 12,510,093 B1
(45) Date of Patent: Dec. 30, 2025

(54) VCT PUMP IMPELLER HAVING MONOTONICALLY DECREASING HEAD WITH INCREASING FLOW RATE

(71) Applicant: Flowserve Pte. Ltd., Singapore (SG)

(72) Inventor: Azfar Ali, Macungie, PA (US)

(73) Assignee: Flowserve Pte. Ltd., Singapore (SG)

( * ) Notice: Subject to any disclaimer, the term of this patent is extended or adjusted under 35 U.S.C. 154(b) by 0 days.

(21) Appl. No.: 19/258,256

(22) Filed: Jul. 2, 2025

(51) Int. Cl.
*F04D 29/24* (2006.01)
*F04D 3/00* (2006.01)
*F04D 29/18* (2006.01)

(52) U.S. Cl.
CPC ........... *F04D 29/242* (2013.01); *F04D 3/005* (2013.01); *F04D 29/181* (2013.01); *F05D 2250/74* (2013.01)

(58) Field of Classification Search
CPC ...... F04D 29/242; F04D 3/005; F04D 29/181; F05D 2250/74
See application file for complete search history.

(56) References Cited

U.S. PATENT DOCUMENTS 6,062,819 A * 5/2000 Zangeneh ............. F04D 29/284 415/181
8,475,131 B2 * 7/2013 Shibata ................. F04D 29/284 416/182
10,474,787 B2 * 11/2019 Choi .................. F04D 29/2205

OTHER PUBLICATIONS

Ali, Azfar et al., "A Study on Eliminating Dip in Head Curve of High Specific Speed Pumps", Published Nov. 17, 2024, International Mechanical Engineering Congress and Exposition, Oregon, USA, 10 pages.

(Continued)

*Primary Examiner* — Eldon T Brockman
(74) *Attorney, Agent, or Firm* — Maine Cernota & Curran

(57) ABSTRACT

A shroudless vertical turbine pump (VTC) impeller and method of design thereof minimizes or eliminates discharge recirculation on the shroud sides of the impeller blades, thereby providing a monotonically decreasing head as a function of flow rate from zero flow to a flow rate that is beyond a best efficiency point (BEP) flow rate, and in embodiments beyond 120% of the BEP. Each blade of the impeller has S-shaped mean and shroud streamlines having inflection points located between the exit gate and the terminating edge. The disclosed method comprises varying locations of the inflections points for candidate designs and applying computational fluid dynamics (CFD) to determine successful candidates that meet all application requirements while providing a monotonic head/flow curve. In embodiments, this process is continued until an optimal impeller design is identified, for example a design that optimizes power, energy efficiency, and/or NPSHR.

16 Claims, 28 Drawing Sheets

(56) References Cited

OTHER PUBLICATIONS

"Saha, Sankar et al. ""Suppression of PerformanceCurve Instability of a Mixed FlowPump by Use of J-groove"". Transactions of the ASME. vol. 122, Sep. 2000. Retrieved on Apr. 3, 2024, 6 pages.".
Takayama, Yumiko et al. "Multi-Objective Design Optimization of a Mixed-Flow Pump" . ASME. Retrieved on Jan. 31, 2016 from https://doi.org/10.1115/FEDSM2009-78348. 9 pages.
Pérez Flores, Paula & Kosyna, G. & Wulff, D. (2008). Suppression of Performance Curve Instability of an Axial-Flow Pump by Using a Double-Inlet-Nozzle. International Journal of Rotating Machinery. 2008.
Veres, Joseph. (1992). A survey of instabilities within centrifugal pumps and concepts for improving the flow range of pumps in rocket engines.

* cited by examiner

Shroud Streamline Parameters, First Exemplary Embodiment

| Length Percent % | Normal Thickness (mm) | Tangential Thickness (mm) | Blade Pressure Side Coordinates Theta (deg) | X-Axis (mm) | Y-Axis (mm) | Z-Axis (mm) | Blade Suction Side Coordinates Theta (deg) | X-Axis (mm) | Y-Axis (mm) | Z-Axis (mm) |
|---|---|---|---|---|---|---|---|---|---|---|
| **TE** | **10.000** | **23.662** | **-31.584** | **230.007** | **-141.410** | **218.302** | **-26.562** | **241.501** | **-120.736** | **218.302** |
| 96 | 9.682 | 22.683 | -35.282 | 219.163 | -155.074 | 210.000 | -30.441 | 231.468 | -136.026 | 210.000 |
| 92 | 9.364 | 21.723 | -39.733 | 205.059 | -170.440 | 200.000 | -35.065 | 218.249 | -153.188 | 200.000 |
| 87 | 9.045 | 20.828 | -44.166 | 189.957 | -184.503 | 190.000 | -39.659 | 203.866 | -169.008 | 190.000 |
| 82 | 8.727 | 19.989 | -48.593 | 173.934 | -197.241 | 180.000 | -44.238 | 188.410 | -183.463 | 180.000 |
| 78 | 8.409 | 19.200 | -53.027 | 157.063 | -208.632 | 170.000 | -48.814 | 171.964 | -196.531 | 170.000 |
| 73 | 8.091 | 18.457 | -57.479 | 139.407 | -218.649 | 160.000 | -53.401 | 154.604 | -208.181 | 160.000 |
| 69 | 7.773 | 17.753 | -61.962 | 121.031 | -227.258 | 150.000 | -58.011 | 136.400 | -218.379 | 150.000 |
| 64 | 7.455 | 17.085 | -66.487 | 101.991 | -234.417 | 140.000 | -62.658 | 117.419 | -227.082 | 140.000 |
| 60 | 7.136 | 16.449 | -71.067 | 82.350 | -240.079 | 130.000 | -67.354 | 97.725 | -234.242 | 130.000 |
| 55 | 6.818 | 15.841 | -75.717 | 62.165 | -244.187 | 120.000 | -72.115 | 77.384 | -239.799 | 120.000 |
| 50 | 6.500 | 15.259 | -80.450 | 41.503 | -246.676 | 110.000 | -76.955 | 56.463 | -243.687 | 110.000 |
| 47 | 6.182 | 14.654 | -84.189 | 25.180 | -247.437 | 102.212 | -80.814 | 39.706 | -245.525 | 102.212 |
| 41 | 5.864 | 14.158 | -90.221 | -0.950 | -246.473 | 90.000 | -86.930 | 13.202 | -246.121 | 90.000 |
| 37 | 5.545 | 13.634 | -95.300 | -22.596 | -243.596 | 80.000 | -92.107 | -8.992 | -244.477 | 80.000 |
| 32 | 5.227 | 13.124 | -100.532 | -44.380 | -238.718 | 70.000 | -97.435 | -31.418 | -240.767 | 70.000 |
| 27 | 4.909 | 12.627 | -105.939 | -66.176 | -231.710 | 60.000 | -102.937 | -53.950 | -234.858 | 60.000 |
| 25 | 4.591 | 12.016 | -109.531 | -80.165 | -225.991 | 53.525 | -106.660 | -68.745 | -229.722 | 53.525 |
| 18 | 4.273 | 11.655 | -117.360 | -109.061 | -210.763 | 40.000 | -114.546 | -98.582 | -215.863 | 40.000 |
| 14 | 3.955 | 11.174 | -123.463 | -129.840 | -196.442 | 30.000 | -120.744 | -120.376 | -202.380 | 30.000 |
| 9 | 3.636 | 10.693 | -129.870 | -149.777 | -179.318 | 20.000 | -127.248 | -141.416 | -185.983 | 20.000 |
| 5 | 3.318 | 10.206 | -136.629 | -168.505 | -159.187 | 10.000 | -134.106 | -161.335 | -166.449 | 10.000 |
| **LE** | **3.000** | **9.708** | **-143.795** | **-185.568** | **-135.840** | **0.000** | **-141.376** | **-179.670** | **-143.550** | **0.000** |

Fig. 9A

Mean Streamline Parameters, First Exemplary Embodiment

| Length | Normal | Tangential | Blade Pressure Side Coordinates | | | | Blade Suction Side Coordinates | | | |
|---|---|---|---|---|---|---|---|---|---|---|
| Percent | Thickness | Thickness | Theta | X-Axis | Y-Axis | Z-Axis | Theta | X-Axis | Y-Axis | Z-Axis |
| % | (mm) | (mm) | (deg) | (mm) | (mm) | (mm) | (deg) | (mm) | (mm) | (mm) |
| **TE** | **11.000** | **19.178** | **-16.142** | **210.870** | **-61.031** | **260.656** | **-11.136** | **215.390** | **-42.400** | **260.656** |
| 95 | 10.643 | 18.049 | -20.018 | 203.821 | -74.258 | 250.000 | -15.251 | 209.287 | -57.062 | 250.000 |
| 90 | 10.286 | 17.170 | -23.566 | 196.602 | -85.754 | 240.000 | -18.979 | 202.829 | -69.758 | 240.000 |
| 85 | 9.929 | 16.451 | -27.087 | 188.741 | -96.530 | 230.000 | -22.641 | 195.657 | -81.608 | 230.000 |
| 80 | 9.571 | 15.863 | -31.250 | 178.470 | -108.298 | 218.302 | -26.896 | 186.176 | -94.437 | 218.302 |
| 76 | 9.214 | 15.353 | -34.232 | 170.696 | -116.142 | 210.000 | -29.971 | 178.853 | -103.139 | 210.000 |
| 71 | 8.857 | 14.929 | -37.924 | 160.679 | -125.195 | 200.000 | -33.725 | 169.415 | -113.093 | 200.000 |
| 66 | 8.500 | 14.566 | -41.751 | 149.638 | -133.563 | 190.000 | -37.591 | 158.935 | -122.354 | 190.000 |
| 61 | 8.143 | 14.249 | -45.745 | 137.771 | -141.402 | 180.000 | -41.610 | 147.609 | -131.099 | 180.000 |
| 56 | 7.786 | 13.965 | -49.938 | 125.034 | -148.683 | 170.000 | -45.819 | 135.390 | -139.318 | 170.000 |
| 51 | 7.429 | 13.703 | -54.366 | 111.195 | -155.121 | 160.000 | -50.252 | 122.036 | -146.745 | 160.000 |
| 47 | 7.071 | 13.448 | -59.061 | 96.345 | -160.733 | 150.000 | -54.949 | 107.622 | -153.411 | 150.000 |
| 42 | 6.714 | 13.187 | -64.051 | 80.485 | -165.392 | 140.000 | -59.943 | 92.125 | -159.202 | 140.000 |
| 37 | 6.357 | 12.902 | -69.361 | 63.613 | -168.890 | 130.000 | -65.265 | 75.515 | -163.915 | 130.000 |
| 32 | 6.000 | 12.577 | -75.010 | 45.778 | -170.968 | 120.000 | -70.939 | 57.802 | -167.286 | 120.000 |
| 27 | 5.643 | 12.193 | -81.011 | 27.110 | -171.379 | 110.000 | -76.984 | 39.077 | -169.052 | 110.000 |
| 24 | 5.286 | 11.667 | -85.920 | 12.153 | -170.365 | 102.212 | -82.006 | 23.753 | -169.138 | 102.212 |
| 18 | 4.929 | 11.177 | -94.048 | -11.757 | -166.132 | 90.000 | -90.203 | -0.590 | -166.546 | 90.000 |
| 13 | 4.571 | 10.517 | -101.052 | -31.245 | -159.972 | 80.000 | -97.355 | -20.865 | -161.654 | 80.000 |
| 8 | 4.214 | 9.750 | -108.319 | -50.108 | -151.341 | 70.000 | -104.815 | -40.764 | -154.120 | 70.000 |
| 3 | 3.857 | 8.880 | -115.782 | -67.786 | -140.332 | 60.000 | -112.518 | -59.684 | -143.965 | 60.000 |
| **LE** | **3.500** | **7.984** | **-120.613** | **-78.185** | **-132.133** | **53.525** | **-117.634** | **-71.211** | **-136.019** | **53.525** |

Fig. 9B

Hub Streamline Parameters, First Exemplary Embodiment

| Length Percent % | Normal Thickness (mm) | Tangential Thickness (mm) | Blade Pressure Side Coordinates Theta (deg) | X-Axis (mm) | Y-Axis (mm) | Z-Axis (mm) | Blade Suction Side Coordinates Theta (deg) | X-Axis (mm) | Y-Axis (mm) | Z-Axis (mm) |
|---|---|---|---|---|---|---|---|---|---|---|
| **TE** | **12.000** | **16.971** | **-2.860** | **169.788** | **-8.482** | **302.212** | **2.860** | **169.788** | **8.482** | **302.212** |
| 94 | 11.619 | 16.006 | -6.884 | 166.272 | -20.075 | 290.000 | -1.409 | 167.429 | -4.117 | 290.000 |
| 89 | 11.238 | 15.274 | -10.061 | 162.580 | -28.846 | 280.000 | -4.761 | 164.549 | -13.705 | 280.000 |
| 84 | 10.857 | 14.645 | -13.213 | 158.182 | -37.139 | 270.000 | -8.049 | 160.882 | -22.750 | 270.000 |
| 79 | 10.476 | 14.095 | -16.166 | 153.452 | -44.483 | 260.656 | -11.111 | 156.774 | -30.790 | 260.656 |
| 74 | 10.095 | 13.604 | -19.608 | 147.301 | -52.473 | 250.000 | -14.623 | 151.303 | -39.476 | 250.000 |
| 69 | 9.714 | 13.159 | -22.928 | 140.796 | -59.557 | 240.000 | -17.996 | 145.395 | -47.232 | 240.000 |
| 64 | 9.333 | 12.748 | -26.380 | 133.555 | -66.239 | 230.000 | -21.480 | 138.724 | -54.590 | 230.000 |
| 58 | 8.952 | 12.387 | -30.642 | 124.102 | -73.518 | 218.302 | -25.722 | 129.950 | -62.603 | 218.302 |
| 54 | 8.571 | 11.989 | -33.820 | 116.763 | -78.226 | 210.000 | -28.933 | 123.003 | -67.994 | 210.000 |
| 49 | 8.190 | 11.621 | -37.884 | 107.168 | -83.380 | 200.000 | -32.980 | 113.903 | -73.914 | 200.000 |
| 44 | 7.810 | 11.249 | -42.227 | 96.764 | -87.823 | 190.000 | -37.295 | 103.957 | -79.178 | 190.000 |
| 39 | 7.429 | 10.864 | -46.883 | 85.683 | -91.509 | 180.000 | -41.918 | 93.281 | -83.749 | 180.000 |
| 34 | 7.048 | 10.456 | -51.879 | 74.107 | -94.439 | 170.000 | -46.888 | 82.041 | -87.634 | 170.000 |
| 29 | 6.667 | 10.019 | -57.235 | 62.090 | -96.473 | 160.000 | -52.231 | 70.267 | -90.691 | 160.000 |
| 24 | 6.286 | 9.543 | -62.967 | 49.726 | -97.456 | 150.000 | -57.970 | 58.027 | -92.753 | 150.000 |
| 19 | 5.905 | 9.025 | -69.084 | 37.161 | -97.233 | 140.000 | -64.116 | 45.441 | -93.650 | 140.000 |
| 14 | 5.524 | 8.461 | -75.583 | 24.593 | -95.664 | 130.000 | -70.675 | 32.687 | -93.210 | 130.000 |
| 9 | 5.143 | 7.851 | -82.452 | 12.277 | -92.648 | 120.000 | -77.638 | 20.008 | -91.291 | 120.000 |
| 4 | 4.762 | 7.202 | -89.665 | 0.515 | -88.139 | 110.000 | -84.984 | 7.707 | -87.803 | 110.000 |
| **LE** | **4.000** | **5.978** | **-95.245** | **-7.679** | **-83.648** | **102.212** | **-91.168** | **-1.712** | **-83.983** | **102.212** |

Fig. 9C

Shroud Streamline Parameters, Second Exemplary Embodiment

| Length | Normal | Tangential | Blade Pressure Side Coordinates | | | | Blade Suction Side Coordinates | | | |
|---|---|---|---|---|---|---|---|---|---|---|
| Percent % | Thickness (mm) | Thickness (mm) | Theta (deg) | X-Axis (mm) | Y-Axis (mm) | Z-Axis (mm) | Theta (deg) | X-Axis (mm) | Y-Axis (mm) | Z-Axis (mm) |
| **TE** | **10.000** | **23.662** | **-42.492** | **200.565** | **-183.733** | **191.046** | **-37.508** | **215.769** | **-165.613** | **191.046** |
| 94 | 9.632 | 22.414 | -47.393 | 182.523 | -198.446 | 180.000 | -42.630 | 198.371 | -182.605 | 180.000 |
| 89 | 9.263 | 21.330 | -51.780 | 165.479 | -210.133 | 170.000 | -47.210 | 181.693 | -196.282 | 170.000 |
| 83 | 8.895 | 20.348 | -56.153 | 147.772 | -220.352 | 160.000 | -51.759 | 164.221 | -208.382 | 160.000 |
| 78 | 8.526 | 19.451 | -60.535 | 129.446 | -229.123 | 150.000 | -56.300 | 146.013 | -218.938 | 150.000 |
| 73 | 8.158 | 18.626 | -64.945 | 110.535 | -236.446 | 140.000 | -60.856 | 127.112 | -227.963 | 140.000 |
| 67 | 7.789 | 17.860 | -69.401 | 91.071 | -242.305 | 130.000 | -65.448 | 107.559 | -235.450 | 130.000 |
| 62 | 7.421 | 17.144 | -73.924 | 71.084 | -246.662 | 120.000 | -70.097 | 87.387 | -241.368 | 120.000 |
| 55 | 7.053 | 16.524 | -79.699 | 45.422 | -249.922 | 107.534 | -75.972 | 61.572 | -246.441 | 107.534 |
| 51 | 6.684 | 15.833 | -83.245 | 29.688 | -250.641 | 100.000 | -79.651 | 45.342 | -248.287 | 100.000 |
| 46 | 6.316 | 15.223 | -88.086 | 8.358 | -250.100 | 90.000 | -84.600 | 23.548 | -249.130 | 90.000 |
| 40 | 5.947 | 14.636 | -93.077 | -13.315 | -247.728 | 80.000 | -89.696 | 1.315 | -248.083 | 80.000 |
| 35 | 5.579 | 14.065 | -98.241 | -35.249 | -243.393 | 70.000 | -94.964 | -21.280 | -245.010 | 70.000 |
| 29 | 5.211 | 13.573 | -104.536 | -61.093 | -235.624 | 58.308 | -101.341 | -47.867 | -238.662 | 58.308 |
| 24 | 4.842 | 12.949 | -109.195 | -79.441 | -228.192 | 50.000 | -106.124 | -67.104 | -232.120 | 50.000 |
| 19 | 4.474 | 12.392 | -115.049 | -101.392 | -216.948 | 40.000 | -112.084 | -90.035 | -221.902 | 40.000 |
| 13 | 4.105 | 11.826 | -121.203 | -122.947 | -202.987 | 30.000 | -118.348 | -112.683 | -208.860 | 30.000 |
| 8 | 3.737 | 11.245 | -127.697 | -143.801 | -186.075 | 20.000 | -124.958 | -134.743 | -192.736 | 20.000 |
| 3 | 3.368 | 10.638 | -134.582 | -163.557 | -165.961 | 10.000 | -131.966 | -155.813 | -173.253 | 10.000 |
| **LE** | **3.000** | **9.708** | **-137.939** | **-172.245** | **-155.421** | **5.304** | **-135.542** | **-165.593** | **-162.490** | **5.304** |

Fig. 10A

Mean Streamline Parameters, Second Exemplary Embodiment

| Length | Normal | Tangential | Blade Pressure Side Coordinates | | | | Blade Suction Side Coordinates | | | |
|---|---|---|---|---|---|---|---|---|---|---|
| Percent % | Thickness (mm) | Thickness (mm) | Theta (deg) | X-Axis (mm) | Y-Axis (mm) | Z-Axis (mm) | Theta (deg) | X-Axis (mm) | Y-Axis (mm) | Z-Axis (mm) |
| **TE** | **11.000** | **19.671** | **-22.611** | **199.226** | **-82.976** | **245.231** | **-17.389** | **205.952** | **-64.497** | **245.231** |
| 97 | 10.605 | 18.693 | -24.563 | 195.028 | -89.138 | 240.000 | -19.568 | 202.048 | -71.820 | 240.000 |
| 92 | 10.211 | 17.640 | -28.354 | 186.384 | -100.583 | 230.000 | -23.582 | 194.105 | -84.729 | 230.000 |
| 87 | 9.816 | 16.766 | -32.099 | 177.178 | -111.140 | 220.000 | -27.506 | 185.509 | -96.595 | 220.000 |
| 81 | 9.421 | 16.027 | -35.845 | 167.334 | -120.885 | 210.000 | -31.397 | 176.206 | -107.542 | 210.000 |
| 76 | 9.026 | 15.393 | -39.642 | 156.419 | -129.595 | 200.000 | -35.301 | 165.781 | -117.382 | 200.000 |
| 71 | 8.632 | 14.823 | -43.107 | 146.142 | -136.791 | 191.046 | -38.864 | 155.861 | -125.604 | 191.046 |
| 65 | 8.237 | 14.346 | -47.532 | 132.691 | -144.967 | 180.000 | -43.349 | 142.911 | -134.904 | 180.000 |
| 60 | 7.842 | 13.899 | -51.696 | 119.715 | -151.561 | 170.000 | -47.572 | 130.302 | -142.561 | 170.000 |
| 54 | 7.447 | 13.482 | -56.050 | 105.929 | -157.344 | 160.000 | -51.978 | 116.836 | -149.424 | 160.000 |
| 49 | 7.053 | 13.083 | -60.627 | 91.339 | -162.282 | 150.000 | -56.602 | 102.506 | -155.469 | 150.000 |
| 44 | 6.658 | 12.688 | -65.456 | 75.918 | -166.249 | 140.000 | -61.478 | 87.268 | -160.582 | 140.000 |
| 38 | 6.263 | 12.282 | -70.564 | 59.665 | -169.087 | 130.000 | -66.639 | 71.098 | -164.607 | 130.000 |
| 33 | 5.868 | 11.852 | -75.975 | 42.614 | -170.604 | 120.000 | -72.114 | 54.007 | -167.347 | 120.000 |
| 26 | 5.474 | 11.461 | -83.174 | 20.387 | -170.319 | 107.534 | -79.346 | 31.713 | -168.578 | 107.534 |
| 22 | 5.079 | 10.856 | -87.766 | 6.586 | -168.802 | 100.000 | -84.084 | 17.412 | -168.030 | 100.000 |
| 17 | 4.684 | 10.261 | -94.176 | -12.046 | -164.994 | 90.000 | -90.622 | -1.795 | -165.423 | 90.000 |
| 12 | 4.289 | 9.587 | -100.917 | -30.667 | -158.990 | 80.000 | -97.525 | -21.205 | -160.527 | 80.000 |
| 6 | 3.895 | 8.827 | -107.968 | -48.867 | -150.683 | 70.000 | -104.775 | -40.399 | -153.171 | 70.000 |
| **LE** | **3.500** | **7.984** | **-116.568** | **-69.014** | **-138.008** | **58.308** | **-113.604** | **-61.784** | **-141.393** | **58.308** |

Fig. 10B

Hub Streamline Parameters, Second Exemplary Embodiment

| Length Percent % | Normal Thickness (mm) | Tangential Thickness (mm) | Blade Pressure Side Coordinates Theta (deg) | X-Axis (mm) | Y-Axis (mm) | Z-Axis (mm) | Blade Suction Side Coordinates Theta (deg) | X-Axis (mm) | Y-Axis (mm) | Z-Axis (mm) |
|---|---|---|---|---|---|---|---|---|---|---|
| **TE** | **12.000** | **17.595** | **-3.135** | **160.564** | **-8.793** | **298.241** | **3.135** | **160.564** | **8.793** | **298.241** |
| 96 | 11.600 | 16.680 | -6.162 | 158.428 | -17.104 | 290.000 | -0.164 | 159.348 | -0.457 | 290.000 |
| 90 | 11.200 | 15.829 | -9.786 | 154.972 | -26.731 | 280.000 | -4.019 | 156.873 | -11.023 | 280.000 |
| 85 | 10.800 | 15.092 | -13.363 | 150.620 | -35.780 | 270.000 | -7.778 | 153.388 | -20.950 | 270.000 |
| 80 | 10.400 | 14.440 | -16.938 | 145.403 | -44.281 | 260.000 | -11.494 | 148.948 | -30.288 | 260.000 |
| 75 | 10.000 | 13.854 | -20.553 | 139.329 | -52.240 | 250.000 | -15.218 | 143.582 | -39.060 | 250.000 |
| 72 | 9.600 | 13.303 | -22.246 | 136.186 | -55.705 | 245.231 | -17.066 | 140.659 | -43.182 | 245.231 |
| 69 | 9.200 | 12.762 | -24.141 | 132.511 | -59.389 | 240.000 | -19.105 | 137.213 | -47.528 | 240.000 |
| 64 | 8.800 | 12.259 | -27.957 | 124.735 | -66.201 | 230.000 | -22.982 | 130.005 | -55.137 | 230.000 |
| 59 | 8.400 | 11.781 | -31.935 | 116.089 | -72.357 | 220.000 | -27.000 | 121.882 | -62.103 | 220.000 |
| 54 | 8.000 | 11.317 | -36.117 | 106.613 | -77.791 | 210.000 | -31.203 | 112.883 | -68.374 | 210.000 |
| 48 | 7.600 | 10.860 | -40.534 | 96.599 | -82.601 | 200.000 | -35.638 | 103.295 | -74.056 | 200.000 |
| 44 | 7.200 | 10.389 | -44.703 | 87.233 | -86.332 | 191.046 | -39.853 | 94.220 | -78.648 | 191.046 |
| 38 | 6.800 | 9.933 | -50.187 | 75.134 | -90.136 | 180.000 | -45.337 | 82.486 | -83.461 | 180.000 |
| 33 | 6.400 | 9.450 | -55.478 | 63.738 | -92.662 | 170.000 | -50.664 | 71.289 | -86.987 | 170.000 |
| 28 | 6.000 | 8.945 | -61.109 | 51.981 | -94.199 | 160.000 | -56.346 | 59.623 | -89.557 | 160.000 |
| 22 | 5.600 | 8.413 | -67.099 | 39.970 | -94.616 | 150.000 | -62.405 | 47.577 | -91.028 | 150.000 |
| 17 | 5.200 | 7.852 | -73.458 | 27.856 | -93.786 | 140.000 | -68.859 | 35.285 | -91.250 | 140.000 |
| 12 | 4.800 | 7.261 | -80.192 | 15.835 | -91.598 | 130.000 | -75.717 | 22.934 | -90.084 | 130.000 |
| 7 | 4.400 | 6.640 | -87.298 | 4.152 | -87.982 | 120.000 | -82.979 | 10.766 | -87.420 | 120.000 |
| **LE** | **4.000** | **5.978** | **-96.719** | **-9.594** | **-81.437** | **107.534** | **-92.542** | **-3.637** | **-81.919** | **107.534** |

Fig. 10C

VCT PUMP IMPELLER HAVING MONOTONICALLY DECREASING HEAD WITH INCREASING FLOW RATE

FIELD OF THE INVENTION

The invention relates to pump impellers, and more particularly, to impellers for high specific speed, high flow, vertical circulating turbine (VCT) pumps.

BACKGROUND OF THE INVENTION

Vertical circulating turbine (VCT) pumps are typically designed for continuous duty, wet-pit applications requiring large capacities at relatively low pressures. VCT pumps are often used in power plants, desalination facilities, cooling water systems, drainage systems, flood protection systems, and water supplies.

A side view of a generic VCT pump 101 is illustrated in FIG. 1A, where a central region of the apparatus is shown as a sectional view. The VCT pump 101 comprises a motor 100 that drives a vertical shaft 102 which descends within a pit 104 into a pump casing 108 and rotates an impeller 106 inside the pump casing 108, which draws a liquid 110 up from the pit and out through a pump outlet 112.

FIG. 1B is a side view of a 4-blade shroudless VCT pump impeller 106 that is typical of the prior art. The impeller 106 comprises a hub 114 that is held onto the end of the shaft 102 by a nut 116. A plurality of blades 118 extend from equally spaced locations about the hub 114. Each of the blades has a pressure side 150 and a suction side 152. Each side 150, 152 of each blade 118 extends radially from a hub "streamline" 126 to a "shroud" streamline 124, and is terminated by a leading edge 120 and a trailing edge 122. A "mean streamline" 128 is indicated for one of the pressure sides in the figure that extends from the leading edge 120 to the trailing edge 122, equidistant between the hub streamline 126 and shroud streamline 124. A radially outward facing shroud side 148 of the blade 118 extends from the shroud streamline of the pressure side (pressure shroud streamline) to the shroud streamline of the suction side (suction shroud streamline). FIG. 1C is a front view of the impeller 106 of FIG. 1B.

With continuing reference to FIGS. 1B and 1C, each point P on the pressure 150 and suction 152 sides of each impeller blade 118 is characterized by its location and its "blade angle" a, where the blade angle $\alpha$ is defined as the angle between a tangent 146 to a streamline 128 at the selected point P and a tangent 138 to a circle 132 passing through the selected point P that is centered on the axis of rotation 130. In in general, there is a blade angle for each point on each side of the blade. However, it is sometimes convenient to characterize the blade shape on the pressure side 150 and the suction side 152 in terms of the blade angles along the shroud streamline 124, the hub streamline 126, and the mean streamline 128. Indicated in FIG. 1B are a "hub" blade angle $\alpha_h$, a "mean" blade angle $\alpha_m$, and a "shroud" blade angle $\alpha_s$ on the suction side 152 of a blade 118. In the figure, these blade angles are shown at arbitrary locations along their respective streamlines. In FIG. 1C, the blade angle $\alpha_m$ of a selected point P on the mean streamline 128 is indicated in more detail. For clarity of illustration, only the radius R of the circle 132 passing through P and centered on the axis of rotation 130 is shown in FIG. 1C. Also illustrated in FIG. 1C is the "meridional" length 140 of the shroud streamline 124 of the blade 118.

The blade angles for a given blade design can be represented as blade angle curves that present the blade angle for a given streamline as a function of its location along the meridional length 140 of the streamline, which can be expressed as a streamline percentage, where the intersection between the streamline and the leading edge (LE) is defined to be 0%, and the intersection of the streamline with the trailing edge (TE) is defined to be 100%. FIG. 1D presents blade angle curves for the mean streamlines 128 of five different commonly used impeller blade designs.

With reference to FIG. 1E, other important features of an IMP impeller are the entrance throat 142 and the exit throat 144, which are formed by extending the leading edge 120 and trailing edge 122, respectively, of a blade 118 across the intervening gap to the next adjacent blade 118 in a plane that is perpendicular to the direction of fluid flow between the blades 118.

With reference to FIG. 1F, the overall shape of a blade 118 can be characterized by the locations of points along the shroud, mean, and hub streamline according to an (X, Y, Z) coordinate system. In FIG. 1F, the impeller is shown with only one blade 118, and the X, Y, and Z coordinates Px, Py, and Pz of a single point P selected along the shroud streamline 124 of the pressure side 150 of the blade 118 are indicated.

FIG. 1G is a graph that compares the head and power as a function of the flowrate for the impeller of FIGS. 1B, 1C, 1E, and IF, where the head, the power, and the flow rate all represented as ratios taken with their best efficiency point (BEP) values. As can readily be seen, there is a "dip" 134 in the head vs. flowrate curve, created due to a positive slope of the curve for flow rates between about 60% and 80% of the BEP flow rate. A similar dip 136 also appears in the power vs flow rate curve.

VCT impellers are often designed with the help of Computational Fluid Dynamics (CFD), which uses numerical methods and algorithms to simulate and analyze fluid flow within a pump impeller, enabling designers to optimize the impeller performance and efficiency. However, even with the aid of CFD, high specific speed VCT pumps, i.e. pumps with specific speeds of 5000 US units or more, typically exhibit unstable head-characteristics at low volumetric flow rates due to the "dip" 134 in the head vs. flowrate curve, which results in a positive slope in the head-curve with increasing flow rate for a certain range of flow rates, typically occurring between 50 to 65 percent of the best efficiency point (BEP) flow rate. This results in a limited operating range for the pump. Furthermore, these pumps usually have a high rise to shut-off in terms of head and power, and cannot generally be used in parallel operation.

Modified pump designs have been proposed for high specific speed pumps that attempt to overcome the sudden decrease of pump head in an axial flow pump by means of casing treatments. For example, it has been proposed that radial, shallow "J-grooves" mounted on the wall or walls of one or more diffusers might be used to reduce or eliminate the head curve dip. However, while J-grooves can remove unwanted flows or vortexes, and thereby improve the efficiency of a pump in the range of flow rates where the head vs. flow rate dip would otherwise occur, J-grooves provide a leakage path, and thereby generally reduce the pump efficiency at higher flowrates, outside of the "dip" region, where such vortexes do not arise.

Another approach is to provide axial grooves in the casing in front of the impeller to break the swirl of the near-casing backflow. However, this approach can result in strong cavitation at the inlet of the grooves for flow rates below the stall point. Also, the performance of the pump suffers at higher flow rates above the stall flow rate.

Still another approach to eliminating the head curve "dip" for high specific speed pumps is to provide a double-inlet-nozzle. However, this approach increases the complexity of the pump, thereby increasing its cost and decreasing its durability. Also, this approach can cause the performance of the pump to suffer at flow rates above the stall flow rate.

What is needed, therefore, is a VCT pump impeller which, when installed in a VCT pump, provides a monotonically decreasing head as a function of increasing process fluid flow rate over a flow range from zero flow to a flow rate that is beyond the best efficiency point (BEP) flow rate of the pump, and preferably above 120% of the BEP flow rate, without requiring grooves or other casing treatments, and without requiring a double inlet nozzle.

SUMMARY OF THE INVENTION

The present invention is a VCT pump impeller, and a method of designing a VCT pump impeller, wherein the disclosed impeller, when installed in a VCT pump, provides a monotonically decreasing head as a function of increasing process fluid flow rate over a flow range from zero flow to a flow rate that is beyond the best efficiency point (BEP) flow rate of the pump, and in embodiments above 120% of the BEP flow rate, without requiring grooves or other casing treatments, and without requiring a double inlet nozzle.

The present invention was enabled by the inventor's analysis, and consequently enhanced understanding, of the causes of instability or "dip" in the head curve for a VCT impeller, whereby for a certain range of flow rates, the head increases as a function of increasing flowrate, rather than monotonically decreasing at all flowrates. Of course, the "Euler's head" or "theoretical head" of any impeller monotonically decreases with increasing flowrate, without any "dip." Accordingly, the head curve "dip" of VCT impellers must be due to excessive head loss occurring over a specific range of flowrates.

It had been commonly accepted before the present invention that discharge recirculation occurring on the radially inward "hub sides," i.e. the hub streamlines, of the impeller blades at low flow rates was the primary reason for the dip in a VCT impeller head curve, especially for high specific speed, high flow rate VCT pumps. However, the present inventor realized that several factors can contribute to the excessive head loss that creates the head curve dip, including suction recirculation, discharge recirculation, recirculation in the bowl, and excessive head loss in one or more components of the pump. In particular, the present inventor found that the dip in VCT impeller head curves was always associated with discharge recirculation on the radially outward sides, or "shroud sides," of the impeller blades, where the shroud side extends between the shroud streamlines on the pressure and suction sides of the blade.

The disclosed impeller provides a monotonically decreasing head with increasing process fluid flow rate by ensuring that the blade loading on the shroud streamlines does not produce discharge recirculation at lower flowrates, thereby minimizing or eliminating discharge recirculation on the shroud side of the impeller at all flow rates, from zero flow up to, and beyond, the BEP flow rate. As a result, the disclosed impeller provides an enhanced operating range of flow rates for a VCT pump.

Structurally, the disclosed impeller is a "shroudless" impeller for which, on both the pressure side and the suction side, the slopes of the shroud and mean streamline blade angle curves are negative at the leading and trailing edges of the blade, while being positive at an "inflection point" that is located between the exit throat and the trailing edge, or vice versa. This is referred to herein as the streamline having an "S" shape.

A more accurate mathematical description of the S-shape is that the blade angle curves along the shroud and mean streamlines are smoothly continuous functions, being mathematically characterized as "c-infinity" curves, and that the second derivatives of the hub and mean streamline blade angle curves change sign at the inflection point, in that the second derivative is positive between the leading edge and the "inflection point" along the meridian length of the streamline, and is negative between the inflection point and the trailing edge. At the inflection point, the slope of the blade angle curve reaches its maximum (in absolute value).

In contrast, for most or all of the prior art high specific speed, high flow rate VCT impellers that are known to the present inventor, either the blade angle curves are "segmented," in that they comprise straight line segments, rather than being smooth, continuous curves, or the blade angle curves are smooth, but their second derivatives do not change sign, i.e. are either negative or positive everywhere between the leading and trailing edges. This means that the slopes of the shroud and mean blade angle curves for these prior art impellers monotonically increase or monotonically decrease over the entire range from leading edge to trailing edge.

According to the present invention, the inflection points of the shroud and mean streamlines are located between the exit throat and the trailing edge at positions which provide a monotonic head vs. flow rate curve. The disclosed method of the present invention comprises selecting a blade shape having S-shaped shroud and mean streamlines according to the requirements of a specific application, wherein the inflection points of the shroud and mean streamlines are between the exit throat and the trailing blade edge. The method further comprises applying CFD analysis to determine if the head vs. flow rate curve includes a "dip," i.e. a region where the head increases with increasing flow rate, and then repeating the process by varying the locations of the inflection points between the exit throat and the trailing edge and applying CFD analysis until optimal locations of the inflection points are found for which the requirements of the application are met, and the head vs. flow rate curve is monotonic.

CFD analysis can only estimate the flow characteristics of a candidate impeller design, once the candidate design has been defined. CFD cannot, by itself, predict a blade shape that will be "dip-less." The present invention enables "dip-less" solutions to be found by applying specific constraints to the impeller design candidates, i.e. by requiring that the blade angle curves of the shroud and mean streamlines are S-shaped, and that the inflection points of these blade angle curves are located between the exit throat and the trailing edge. According to these constraints, the only remaining "variables" are the specific locations of the shroud and mean streamline inflection points. Identifying candidate impeller designs is thereby reduced to simply varying the locations of the inflection points of the candidate designs between the exit throat and the trailing edge. Application of CFD to these candidates can then rapidly identify which of them are dip-less.

In embodiments, there may be ranges of inflection point locations over which the resulting impellers and VCT pumps are dip-less. In some of these embodiments, CFD is used to identify the inflection point locations within these ranges that will be "optimal" for a given application, where "optimal" may mean, for example, that the design will provide the greatest power, highest efficiency, lowest required net positive suction head (NPSHR), or some optimal combination of these features.

A first general aspect of the present invention is a vertical circulating turbine (VCT) pump configured to vertically pump a process fluid. The VCT comprises a shroudless impeller configured to be rotated about a vertical axis within a pump casing. The impeller includes a central hub, and a plurality of identical impeller blades equally spaced about and extending radially outward from the central hub.

Each of the blades includes a pressure side configured to apply pressure to a fluid when the impeller is rotated, and a suction side opposite the pressure side. Each of the pressure side and the suction side includes a leading edge (LE) of the blade adjoining an inlet throat of the impeller, a trailing edge (TE) of the blade adjoining an exit throat of the impeller, a shroud streamline defined by a radially outward edge of the blade side, the shroud streamline having a shroud meridional length extending from the leading edge to the trailing edge, a hub streamline defined by a radially inward edge of the blade side coincident with a juncture of the blade side with the hub, the hub streamline having a hub meridional length extending from the leading edge to the trailing edge, and a mean streamline having a mean meridional length extending from the leading edge to the trailing edge, the mean streamline being equally spaced between the shroud and hub streamlines.

All of the shroud streamlines and the mean streamlines are S-shaped, having blade angles that increase from the leading edge to an inflection point and decrease from the inflection point to the trailing edge, or having blade angles that decrease from the leading edge to an inflection point and increase from the inflection point to the trailing edge, and all of the inflection points on all of the shroud and mean streamlines are between the exit throat and the trailing edge. The blade further includes a shroud side extending between the pressure side shroud streamline and the suction side shroud streamline, The inflection points are provided on the shroud and mean streamlines at locations that minimize or eliminate discharge recirculation on the shroud sides of the impeller blades when the impeller is rotated within the pump casing, thereby causing the VCT pump to provide a monotonically decreasing head as a function of a flow rate of the process fluid over a range of flow rates of the process fluid from zero flow to a flow rate that is beyond a best efficiency point (BEP) flow rate of the VCT pump.

In embodiments, the VCT pump is able to provide flow rates from zero to 30,000 gallons-per-minute (gpm).

In any of the above embodiments, the VCT pump can be able to provide the monotonically decreasing head as a function of a flow rate of the process fluid over a range of flow rates of the process fluid from zero flow to a flow rate that is above 120% of the BEP flow rate.

In any of the above embodiments, for each of the blades the blade angle curves of the shroud, mean, and hub streamlines on the pressure side can be substantially identical to the blade angle curves of the shroud, mean, and hub streamlines on the suction side, respectfully.

In some of these embodiments, the blade angle curves of the shroud, mean, and hub streamlines are characterized by the equation $Y=ax^3+bx^2+cx+d$, where Y is the blade angle, in degrees, x is the meridional length location along the streamline (in mm), and a, b, c, and d are constants, and for each of the blade angle curves, meridional length locations X along the streamline in units of percentage of the total meridional length are equal to x divided by the total meridional length M of the streamline.

In some of these embodiments, for the shroud streamline blade angle curve, a=3.54E−08, b=−0.00032, c=0.100452, d=18, and M=218 mm, for the hub streamline blade angle curve, a=−6.9E−06, b=0.001913, c=−0.0925, d=42, and M=200 mm, and for the mean streamline blade angle curve, a=−6.2E−06, b−0.001736, c=−0.05057, d=26, and M=207 mm.

In other of these embodiments, for the shroud streamline blade angle curve, a=−6.8E−07, b=−0.0002, c=0.099075, d=18, and M=186 mm, for the hub streamline blade angle curve, a=−5.83−06, b=0.001434, c=−0.05676, d=42, and M=191 mm, and for the mean streamline blade angle curve, a=−5.8E−06, b=0.001308, c=0.001018, d=26, and M=187 mm.

A second general aspect of the present invention is a method of designing a VCT pump configured to meet specified requirements of a VCT pump application by vertically pumping a process fluid, while providing a monotonically decreasing head as a function of a flow rate of the process fluid over a range of flow rates of the process fluid from zero flow to a flow rate that is beyond a best efficiency point (BEP) flow rate of the VCT pump. The method includes the following steps:

A) determining an initial candidate pump design having an initial candidate impeller design, the candidate impeller design comprising a plurality of identical blades equally spaced about, and extending radially outward from, a central hub, each of the blades having a candidate blade shape comprising a pressure blade side and a suction blade side, each of the pressure and suction blade sides comprising a plurality of streamlines extending from a leading edge thereof to a trailing edge thereof, the plurality of streamlines comprising a shroud streamline at a radially outward edge of the blade side, a hub streamline along a radially inward edge of the blade side, and a mean streamline equally spaced apart from the shroud and hub streamlines. All of the shroud streamlines and the mean streamlines are S-shaped, having blade angles that increase from the leading edge to an inflection point and decrease from the inflection point to the trailing edge, or having blade angles that decrease from the leading edge to an inflection point and increase from the inflection point to the trailing edge. And all of the inflection points on all of the shroud and mean streamlines are between the exit throat and the trailing edge.

B) Determining whether the candidate pump design meets all of the specified requirements of the VCT pump application by applying computational fluid dynamics (CFD) to the candidate impeller design, and if not then modifying the candidate impeller design and repeating step B).

C) If the candidate pump design meets all of the specified requirements of the VCT pump application, applying CFD to determine if a head vs flow rate curve of the candidate pump design is monotonic from zero flow to a flow rate that is beyond a best efficiency point (BEP) flow rate of the candidate pump design, and if not, then moving at least one of the inflection points of the shroud and mean streamlines of the candidate impeller design to a different location between the exit gate and the trailing edge, and repeating steps B) and C) until a successful VCT pump design is identified.

In embodiments, the method further comprises repeating steps A), B), and C) until an optimal VCT pump design is identified that provides optimal performance for the VCT pump application.

In some of these embodiment, the optimal VCT pump design causes the VCT pump to provide at least one of: maximum power, highest energy efficiency, and lowest required net positive suction head (NPSHR).

In any of the above embodiments, the successful VCT pump design can be able to provide flow rates from zero to 30,000 gallons-per-minute (gpm).

In any of the above embodiments, the successful VCT pump design can be able to provide the monotonically decreasing head as a function of a flow rate of the process fluid over a range of flow rates of the process fluid from zero flow to a flow rate that is above 120% of the BEP flow rate.

In any of the above embodiments, for each of the blades of each blade of each of the candidate impeller designs, the blade angle curves of the shroud, mean, and hub streamlines on the pressure side are substantially identical to the blade angle curves of the shroud, mean, and hub streamlines on the suction side, respectfully.

In some of these embodiments, the blade angle curves of all of the shroud, mean, and hub streamlines of all of the candidate impeller designs are characterized by the equation $Y=ax^3+bx^2+cx+d$, where Y is the blade angle, in degrees, x is the meridional length location along the streamline (in mm), and a, b, c, and d are constants, and for each of the blade angle curves, meridional length locations X along the streamline in units of percentage of the total meridional length are equal to x divided by the total meridional length M of the streamline.

In some of these embodiments, for all of the shroud streamline blade angle curves, a=3.54E−08, b=−0.00032, c=0.100452, d=18, and M=218 mm, for all of the hub streamline blade angle curves, a=−6.9E−06, b=0.001913, c=−0.0925, d=42, and M=200 mm, and for all of the mean streamline blade angle curves, a=−6.2E−06, b−0.001736, c=−0.05057, d=26, and M=207 mm.

In other of these embodiments, for all of the shroud streamline blade angle curves, a=−6.8E−07, b=−0.0002, c=0.099075, d=18, and M=186 mm, for all of the hub streamline blade angle curves, a=−5.83−06, b=0.001434, c=−0.05676, d=42, and M=191 mm, and for all of the mean streamline blade angle curves a=−5.8E−06, b=0.001308, c=0.001018, d=26, and M=187 mm.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 9A is a table that presents shroud streamline parameters of the first exemplary embodiment;

FIG. 9B is a table that presents mean streamline parameters of the first exemplary embodiment;

FIG. 9C is a table that presents hub streamline parameters of the first exemplary embodiment;

FIG. 10A is a table that presents shroud streamline parameters of the second exemplary embodiment;

FIG. 10B is a table that presents mean streamline parameters of the second exemplary embodiment;

FIG. 10C is a table that presents hub streamline parameters of the second exemplary embodiment.

DETAILED DESCRIPTION

The present invention is a VCT pump impeller, and a method of designing a VCT pump impeller, wherein the disclosed impeller, when installed in a VCT pump, provides a monotonically decreasing head as a function of increasing process fluid flow rate over a flow range from zero flow to a flow rate that is beyond the best efficiency point (BEP) flow rate of the pump, and in embodiments above 120% of the BEP flow rate, without requiring grooves or other special casing treatments, and without requiring a double inlet nozzle.

Figure 2A:
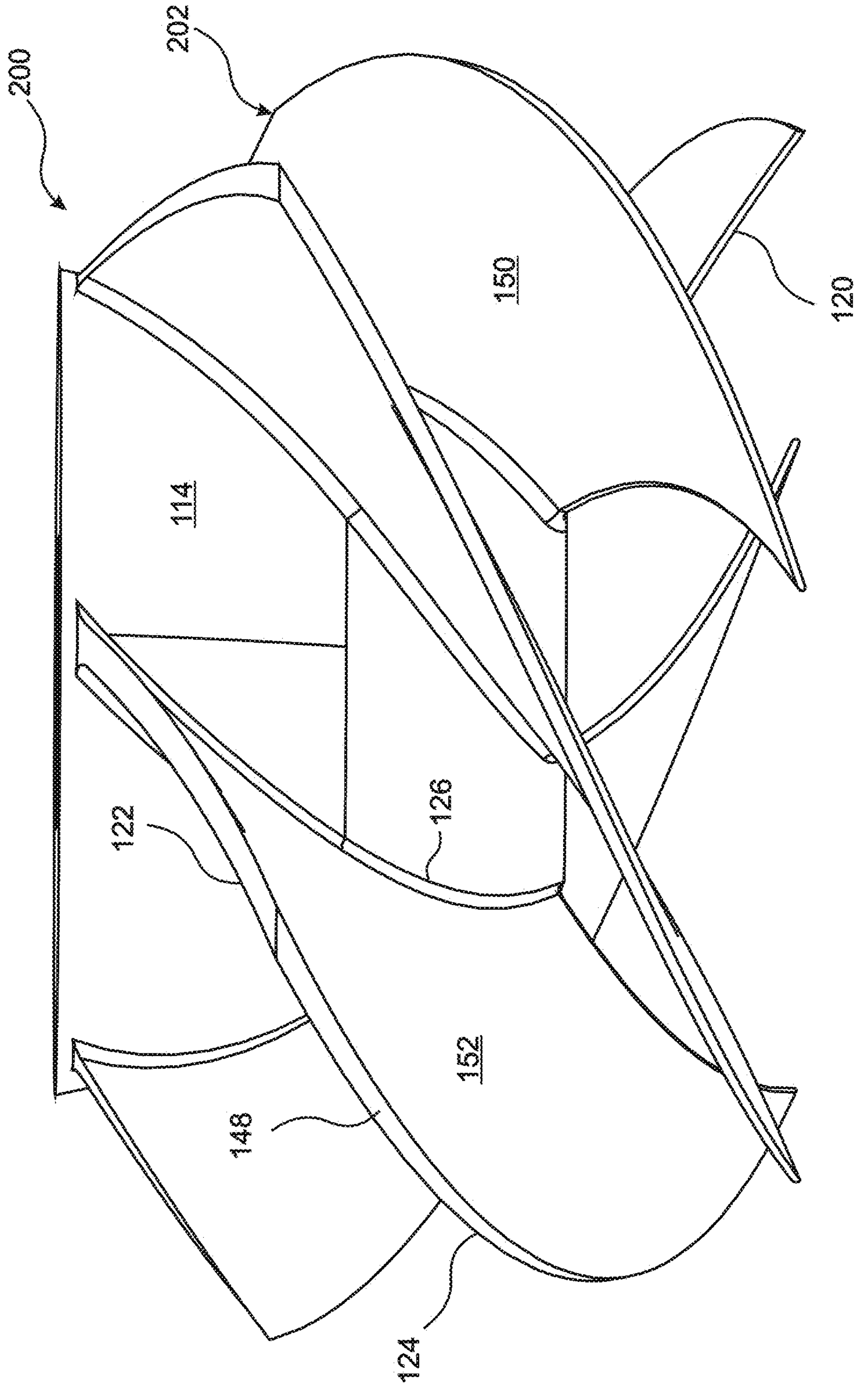
FIG. 2A is a side view of a first exemplary embodiment of the present invention.
Figure 2B:
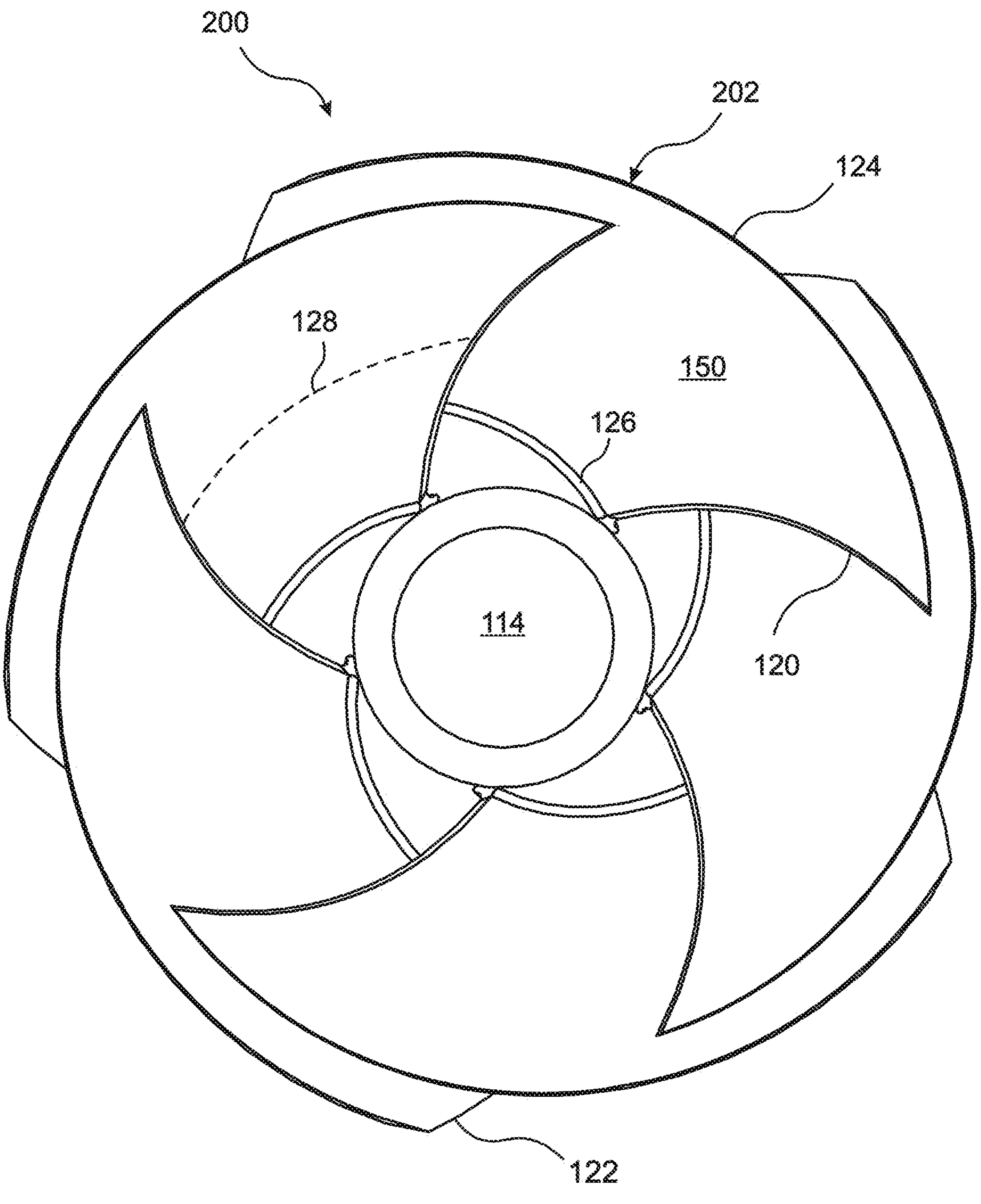
FIG. 2B is a top view of the impeller of FIG. 2A.

With reference to a first exemplary embodiment, for which a side view is presented in FIG. 2A and a front view is presented in FIG. 2B, the disclosed impeller 200 is a "shroudless" impeller that provides an enhanced operating range by implementing a novel blade shape, without requiring grooves or other casing treatments, and without implementing a double inlet nozzle.

Figure 3:
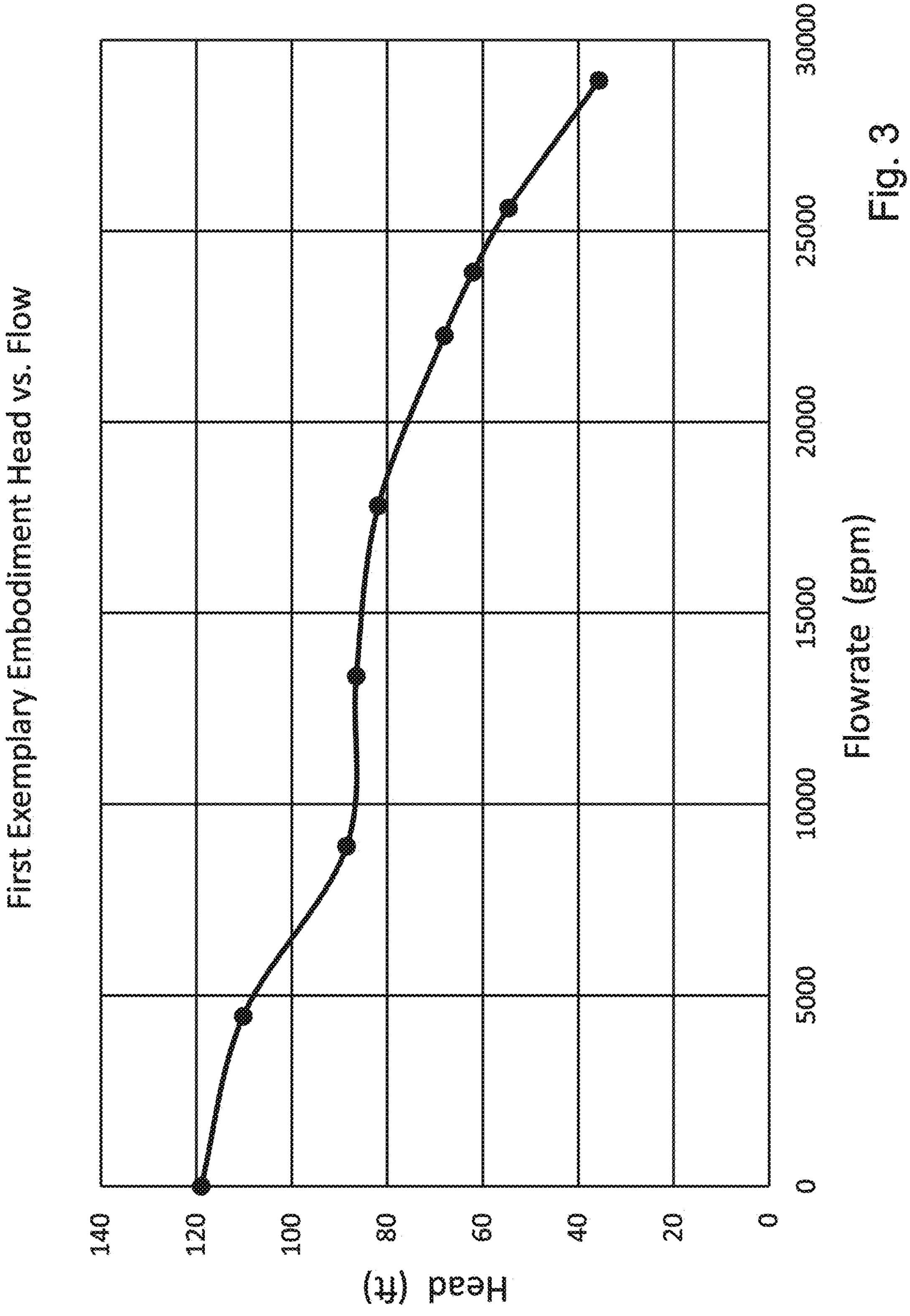
FIG. 3 is a graph showing the head vs. flowrate curve for the impeller of the first exemplary embodiment.

The novel blade shape of the disclosed impeller 200 eliminates the “dip” 134 in the head vs flowrate curve of the pump. This can be seen, for example, in FIG. 3, which is a head vs. flowrate curve for the first exemplary embodiment. It can be seen in the figure that the slope of the head vs. flowrate curve varies over the range of zero to 30,000 gallons per minute (gpm), but never changes sign. In other words, the head monotonically decreases as the flowrate increase over the full range of flowrates.

Figure 4A:
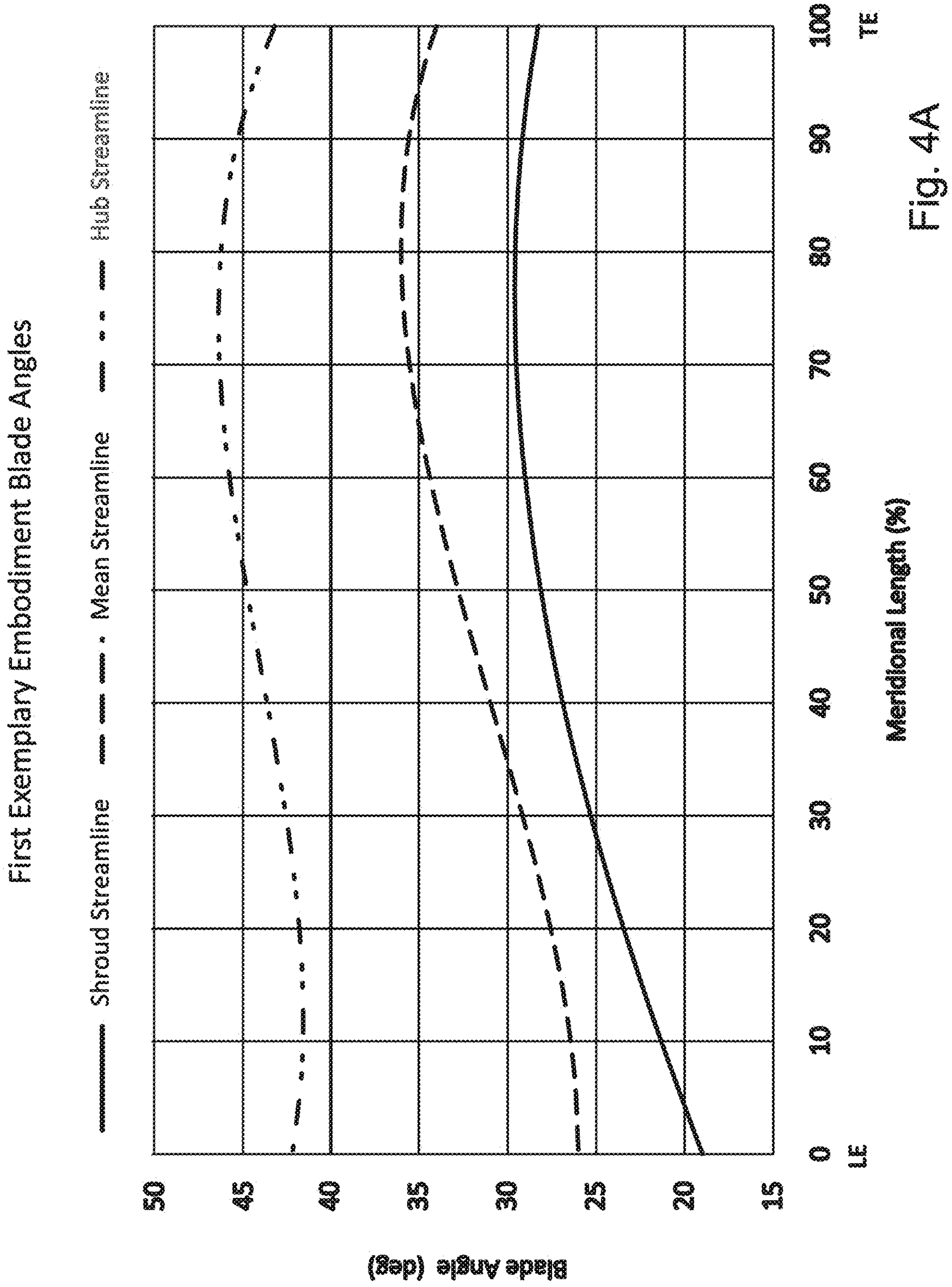
FIG. 4A is a graph that presents shroud, mean, and hub streamlines for the impeller of the first exemplary embodiment.

With reference to FIG. 4A, the blade shape of the disclosed impeller 200 can be characterized by the shapes of its blade angle curves, taken along the hub and shroud streamlines of the pressure side 150 and suction side 152 of the blade and along a “mean” streamline that is equidistant between the shroud and hub streamlines. It can be seen in FIG. 4A that the slopes of the shroud and mean streamline blade angle curves of the first exemplary embodiment are negative at the leading (LE) 120 and trailing (TE) 122 edges of the blade 202, while being positive over a range of locations in between. In other embodiments, this relationship is reversed, in that the slopes of the shroud and mean streamline blade angle curves are positive at the leading 120 and trailing 122 edges of the blade 202, while being negative over an intermediate range between the leading 120 and trailing 122 edges.

Figure 4B:
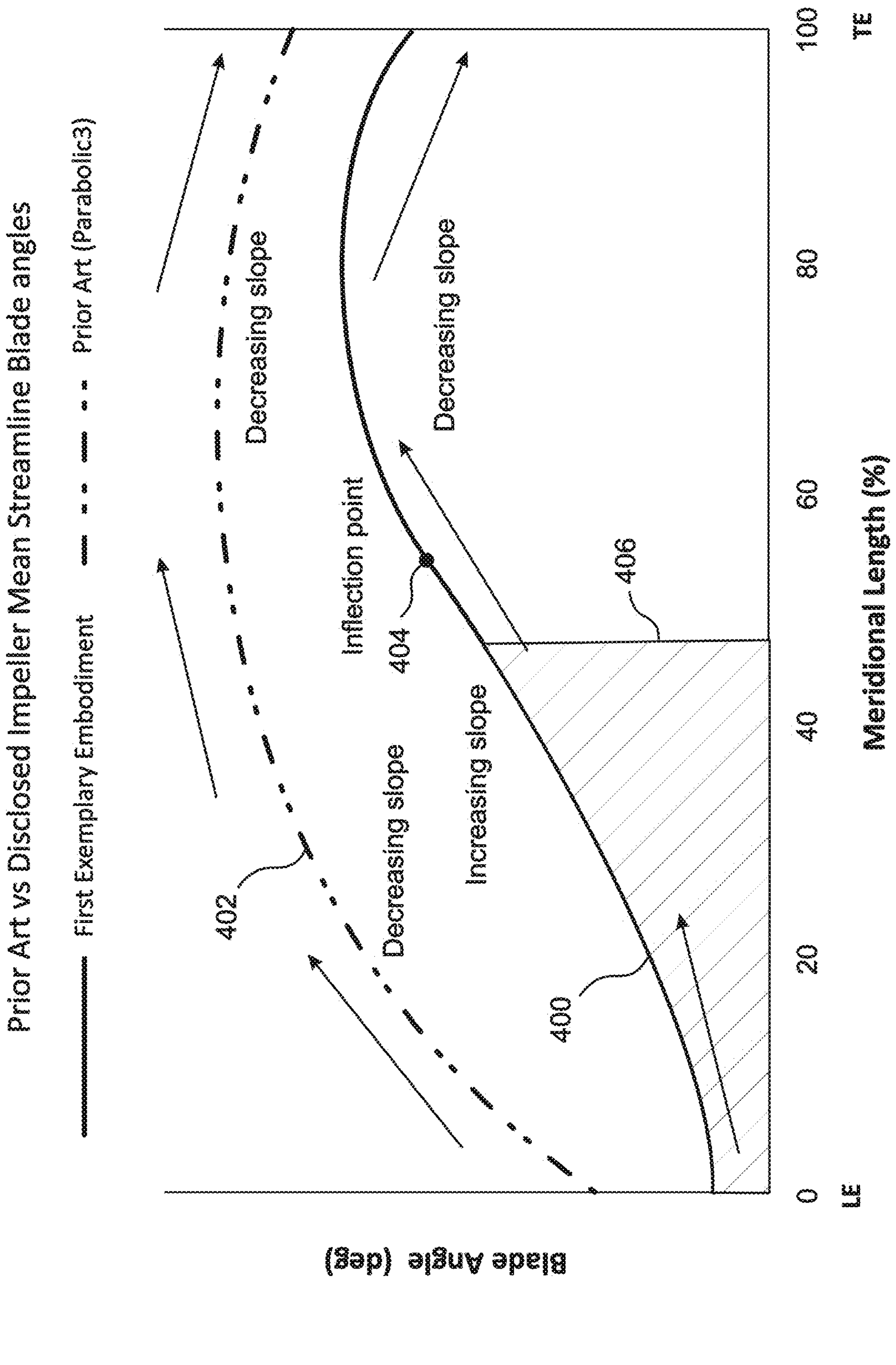
FIG. 4B is a graph that compares the blade angle curve of the first exemplary embodiment with the blade angle curve of a typical VCT impeller of the prior art.

A more accurate mathematical description of the blade angle curves for the disclosed impeller 200 is that they are smoothly continuous functions, being mathematically characterized as “c-infinity” curves, and that the second derivatives of the hub and mean streamline blade angle curves change sign. FIG. 4B compares the mean streamline blade shape curve of the first representative embodiment 400 with a typical mean streamline blade shape curve of the prior art 402. It can be seen in the drawing that, for the illustrated embodiment, the second derivative of the mean streamline curve of the present invention 400 is positive, i.e. the slope of the curve 400 increases, between the leading edge (LE) and an “inflection point” 404 at a selected location along the streamline between the exit throat 406 and the and trailing edge (TE), and is negative between the inflection point 404 and the trailing edge. In contrast, the slope of the illustrated prior art mean streamline blade angle curve 402 decreases monotonically from the leading edge to the trailing edge.

Figure 1A:
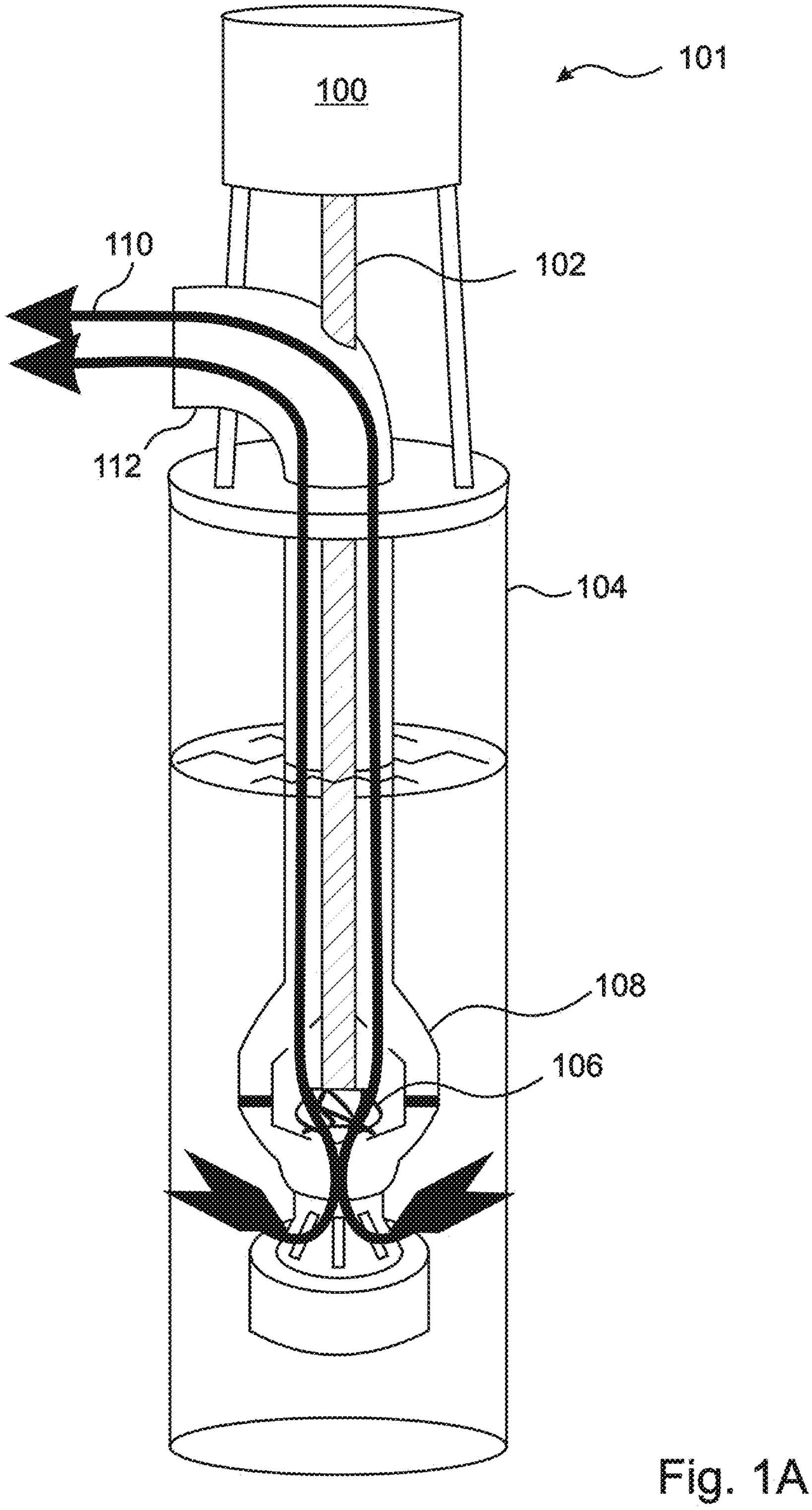
FIG. 1A is a side view of a typical VCT pump of the prior art, in which the lower portion is presented as a sectional view.
Figure 1B:
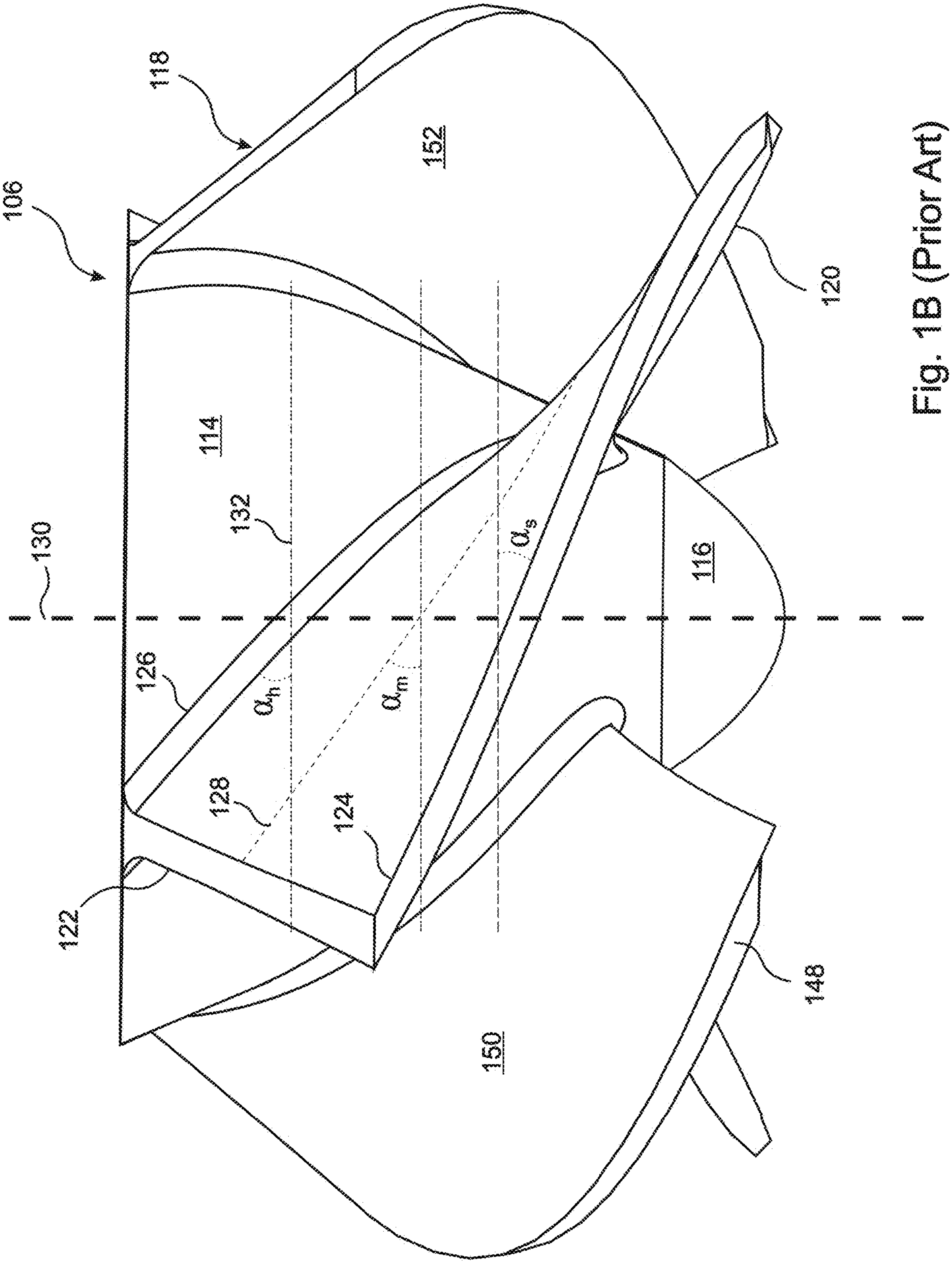
Fig. 1B (Prior Art)
FIG. 1B is a side view of a typical VCT pump impeller of the prior art.
Figure 1C:
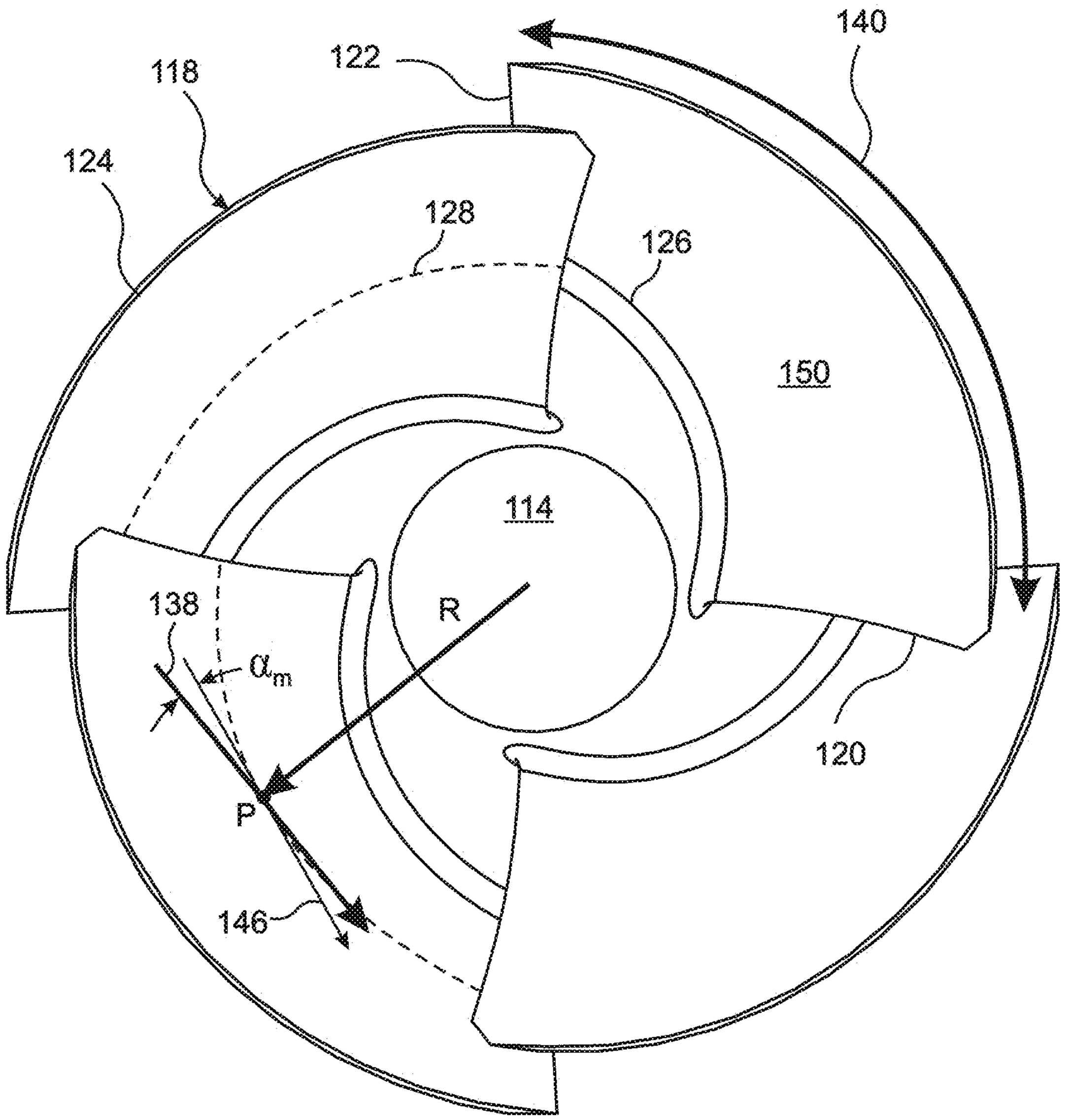
Fig. 1C (Prior Art)
FIG. 1C is a top view of the impeller of FIG. 1B.
Figure 1D:
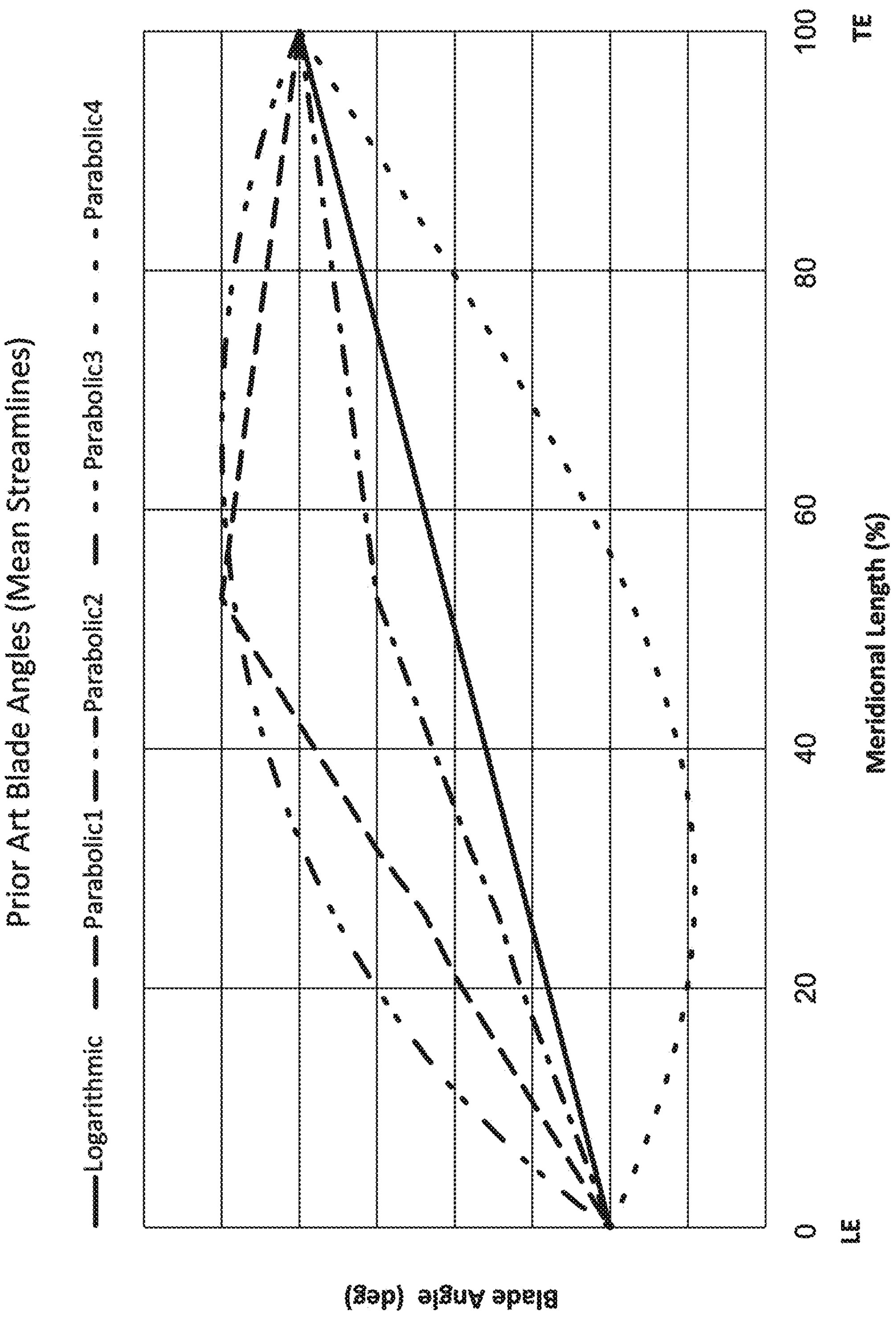
Fig. 1D (Prior Art)
FIG. 1D is a graph that compares blade angle curves for a variety of different impeller types of the prior art.
Figure 1E:
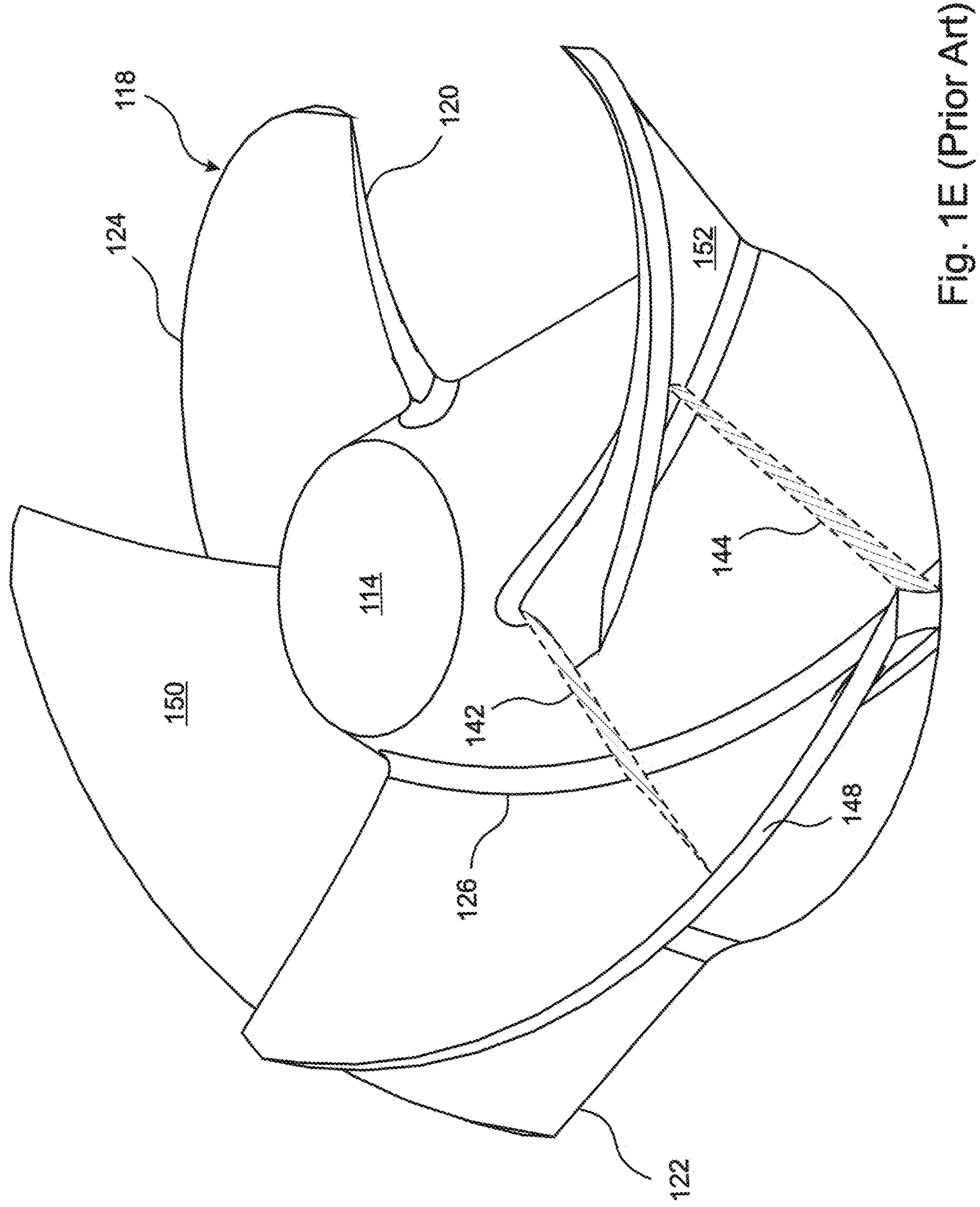
Fig. 1E (Prior Art)
FIG. 1E is a perspective view of the impeller of FIG. 1B wherein the entrance and exit throats are indicated.

With reference again to FIG. 1D, for all of the prior art high specific speed, high flow rate VCT impellers that are known to the present inventor, either the blade angle curves are “segmented,” in that they comprise straight line segments rather than being smooth, continuous curves, or the blade angle curves are smooth, but the second derivatives do not change sign, i.e. are either negative or positive everywhere between the leading and trailing edges. This means that the slopes of the blade angle curves for these prior art impellers monotonically increase or monotonically decrease over the entire range from leading edge to trailing edge.

Figure 5A:
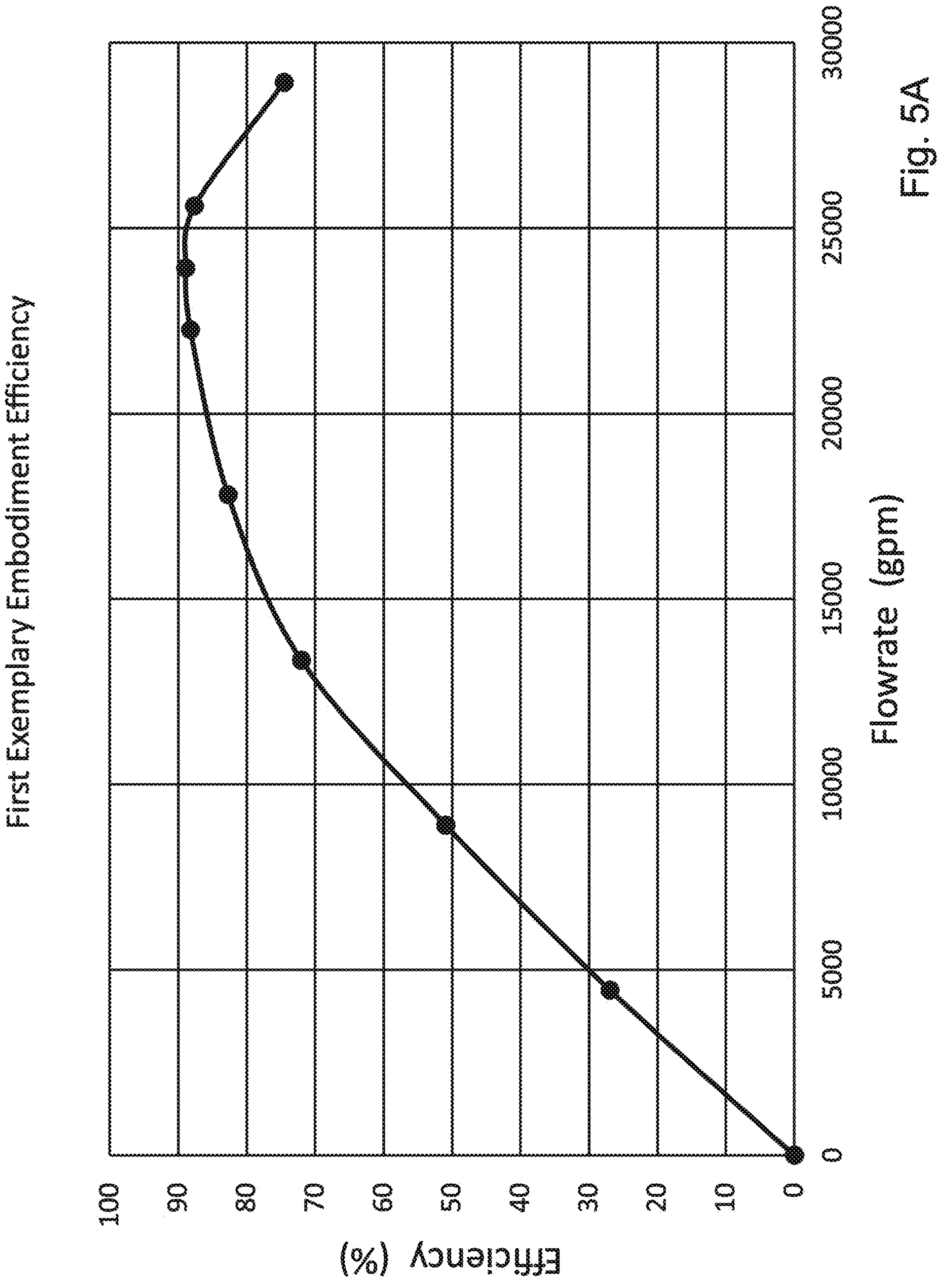
FIG. 5A is a graph that presents the efficiency vs. flowrate curve of the first exemplary embodiment.
Figure 5B:
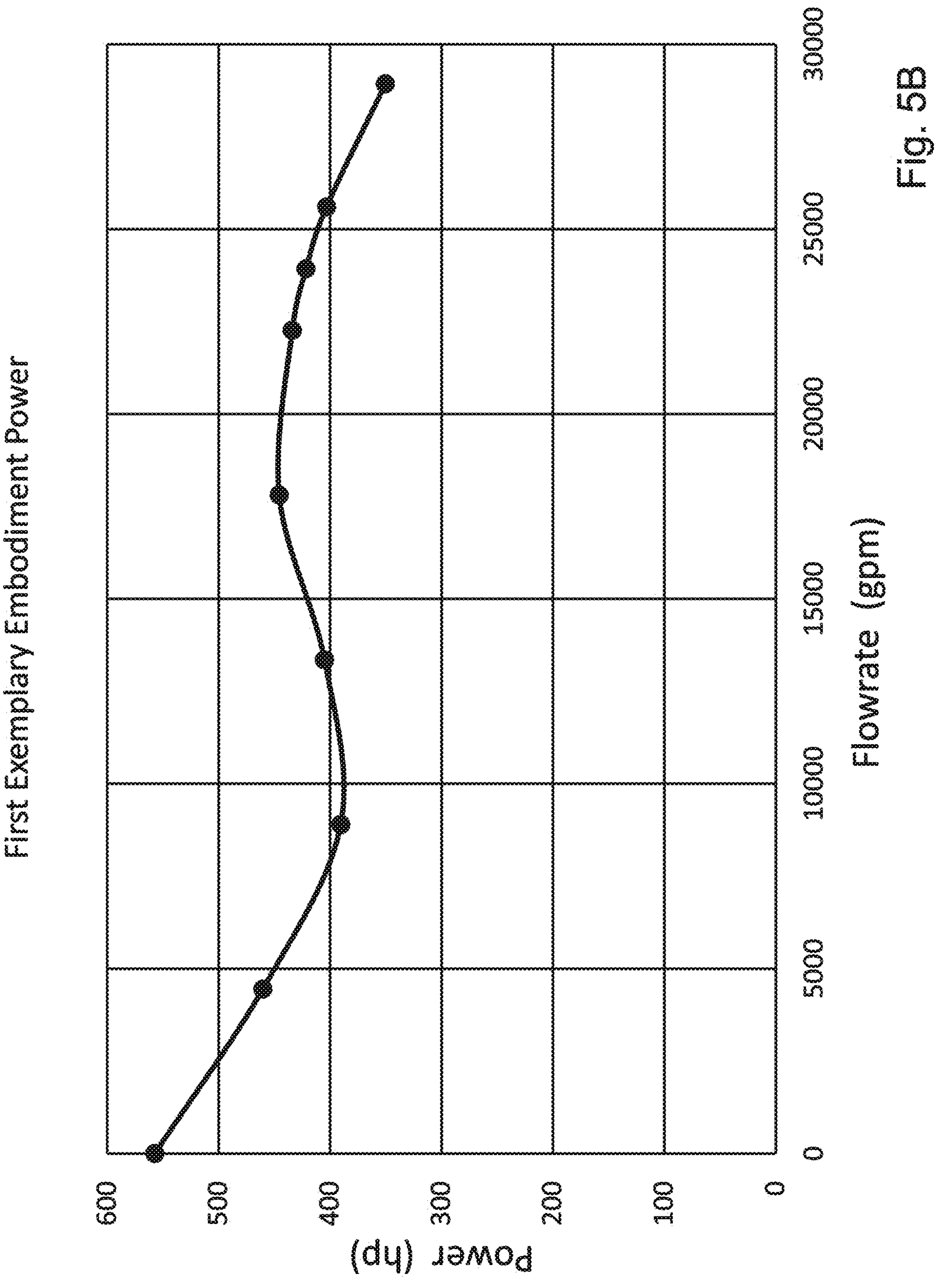
FIG. 5B is a graph that presents the power vs. flowrate curve of the first exemplary embodiment.
Figure 5C:
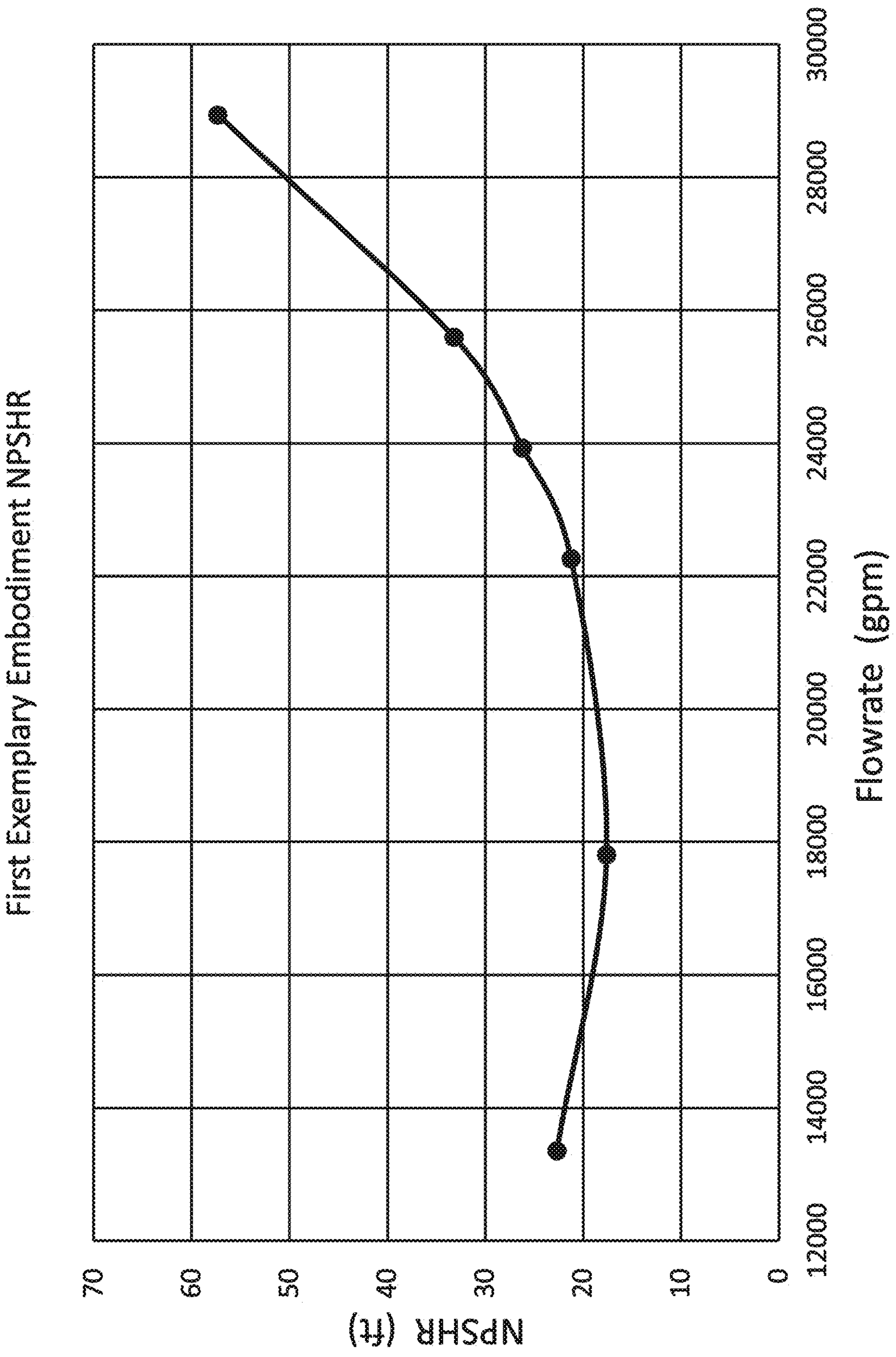
FIG. 5C is a graph that presents the NPSHR vs. flowrate curve of the first exemplary embodiment.

FIGS. 5A-5C are graphs that present the efficiency, power, and required net positive suction head (NPSHR) respectively for the first exemplary embodiment illustrated in FIGS. 2A and 2B. The head vs. flowrate curve for this embodiment is presented in FIG. 3 as discussed above.

Figure 6A:
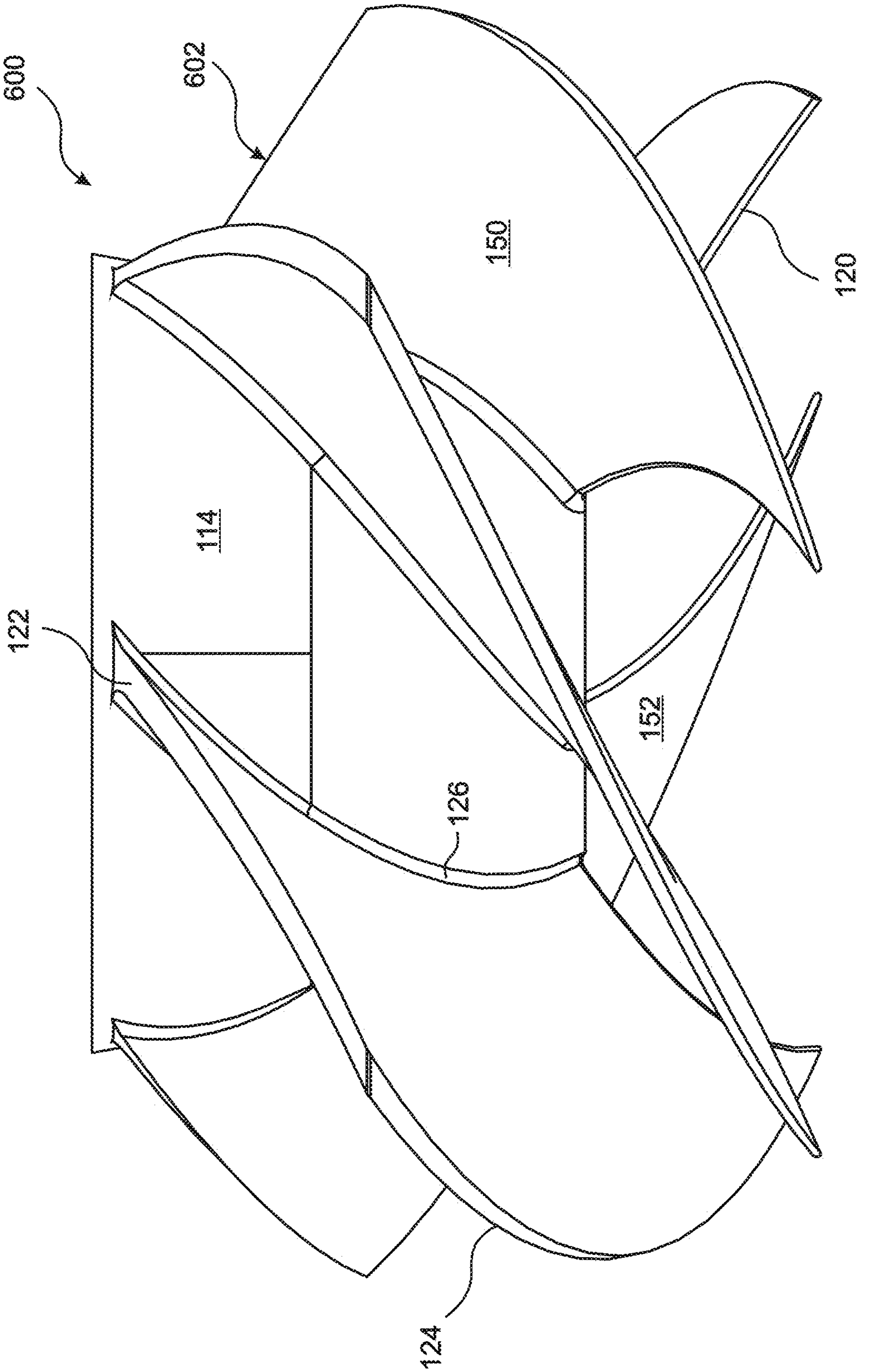
FIG. 6A is a side view of a second exemplary embodiment of the present invention.
Figure 6B:
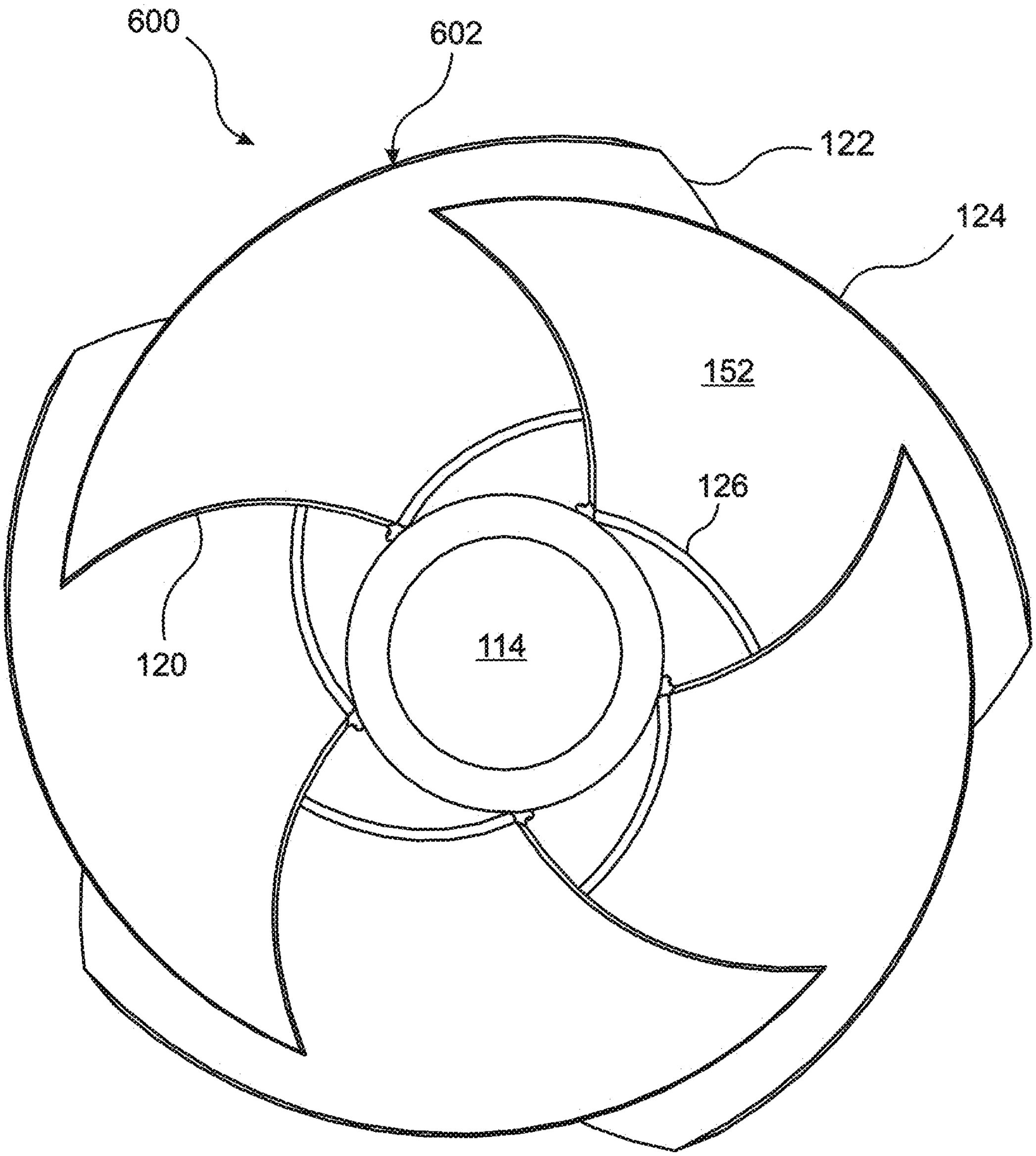
FIG. 6B is a top view of the second exemplary embodiment.
Figure 7:
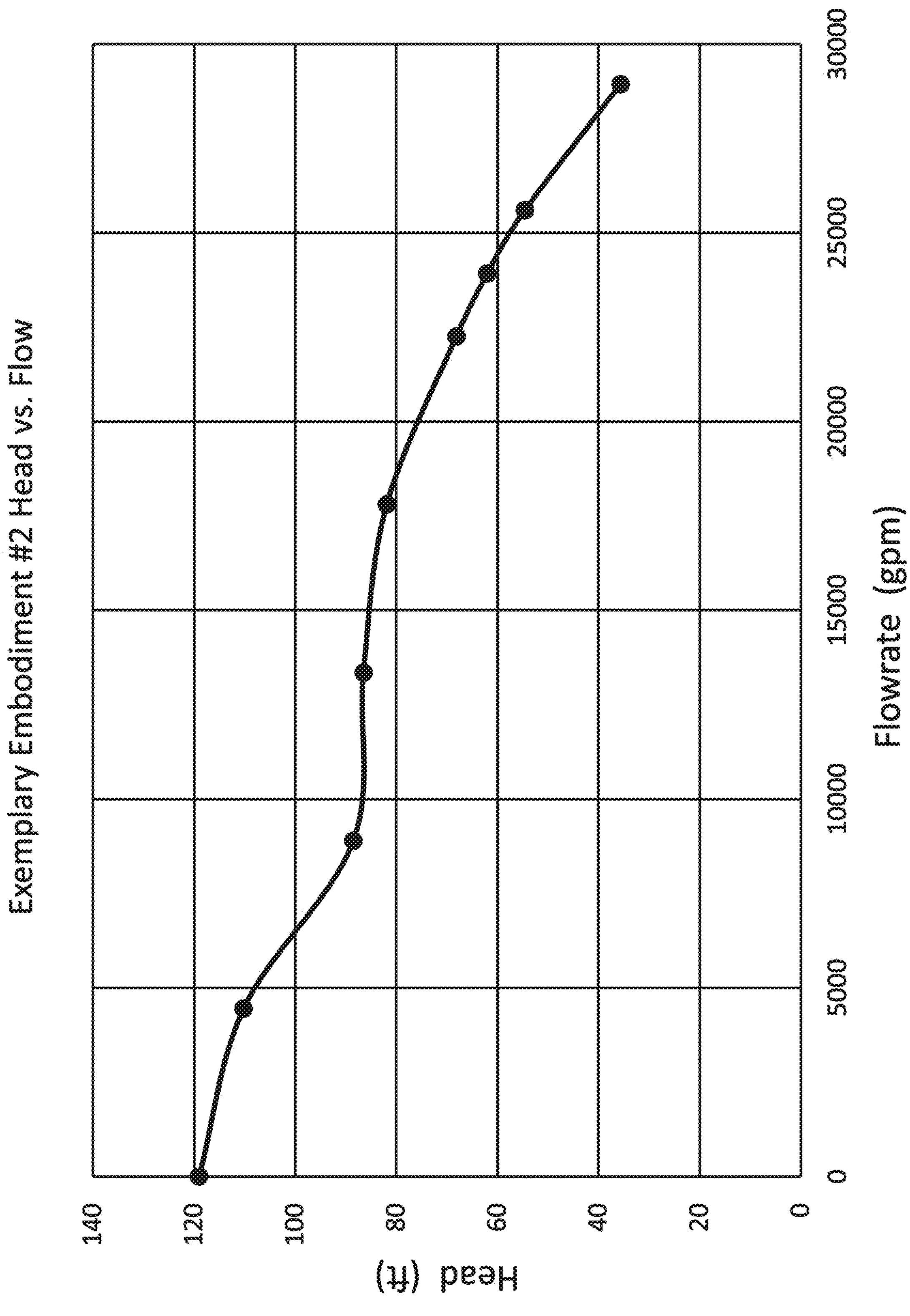
FIG. 7 is a graph that presents the head vs. flowrate curve of the second exemplary embodiment.
Figure 8A:
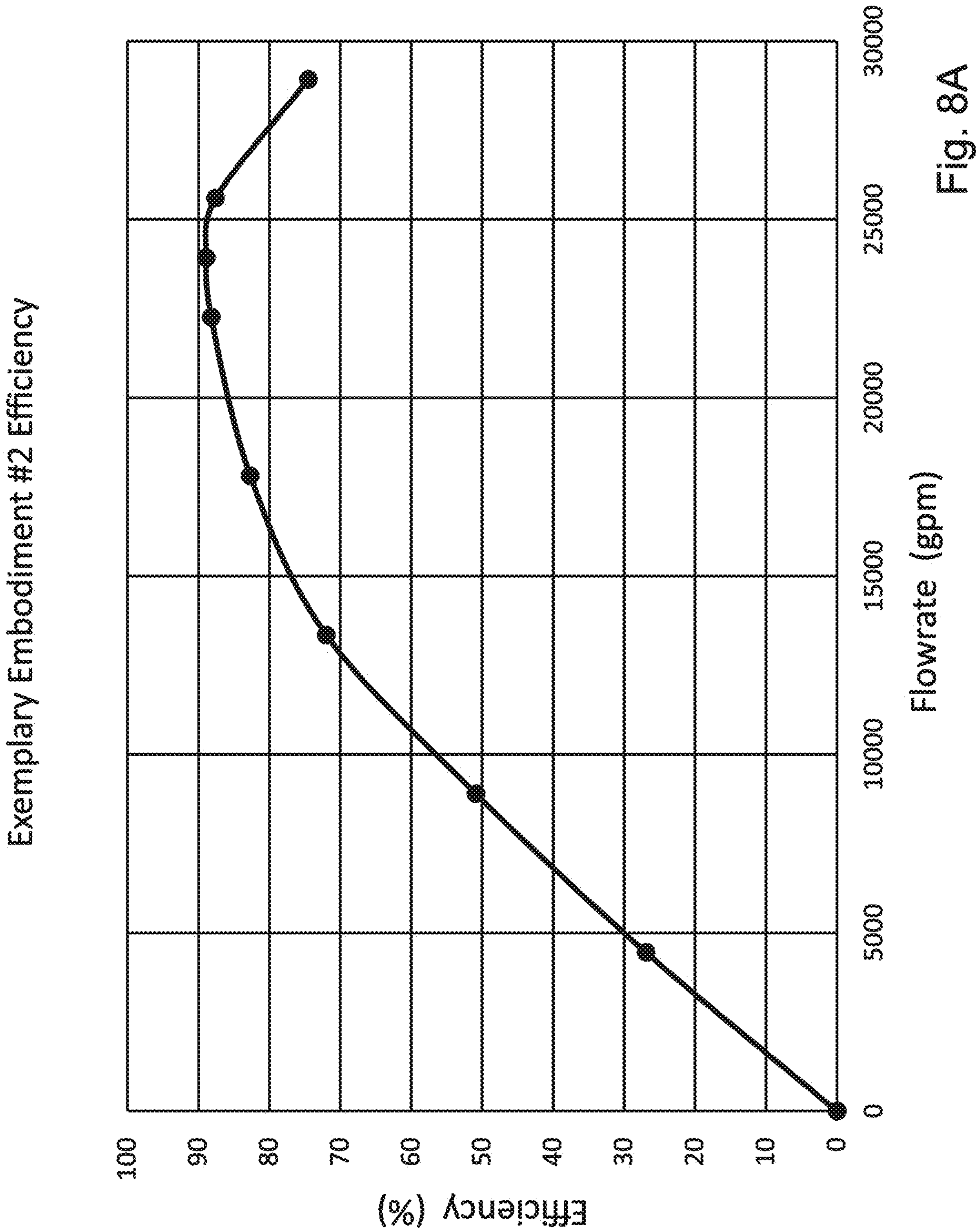
FIG. 8A is a graph that presents the efficiency vs. flowrate curve of the second exemplary embodiment.
Figure 8B:
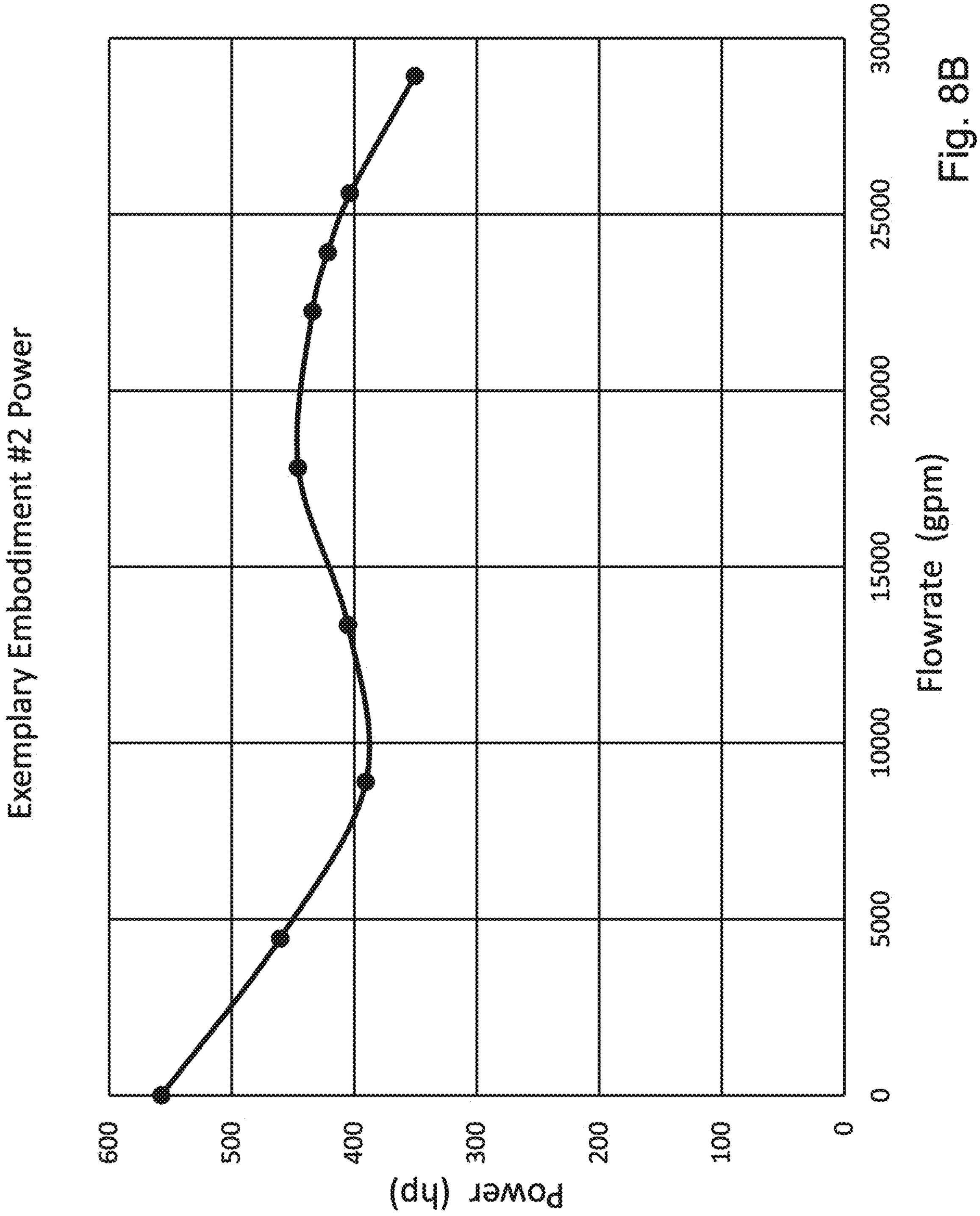
FIG. 8B is a graph that presents the power vs. flowrate curve of the second exemplary embodiment.
Figure 8C:
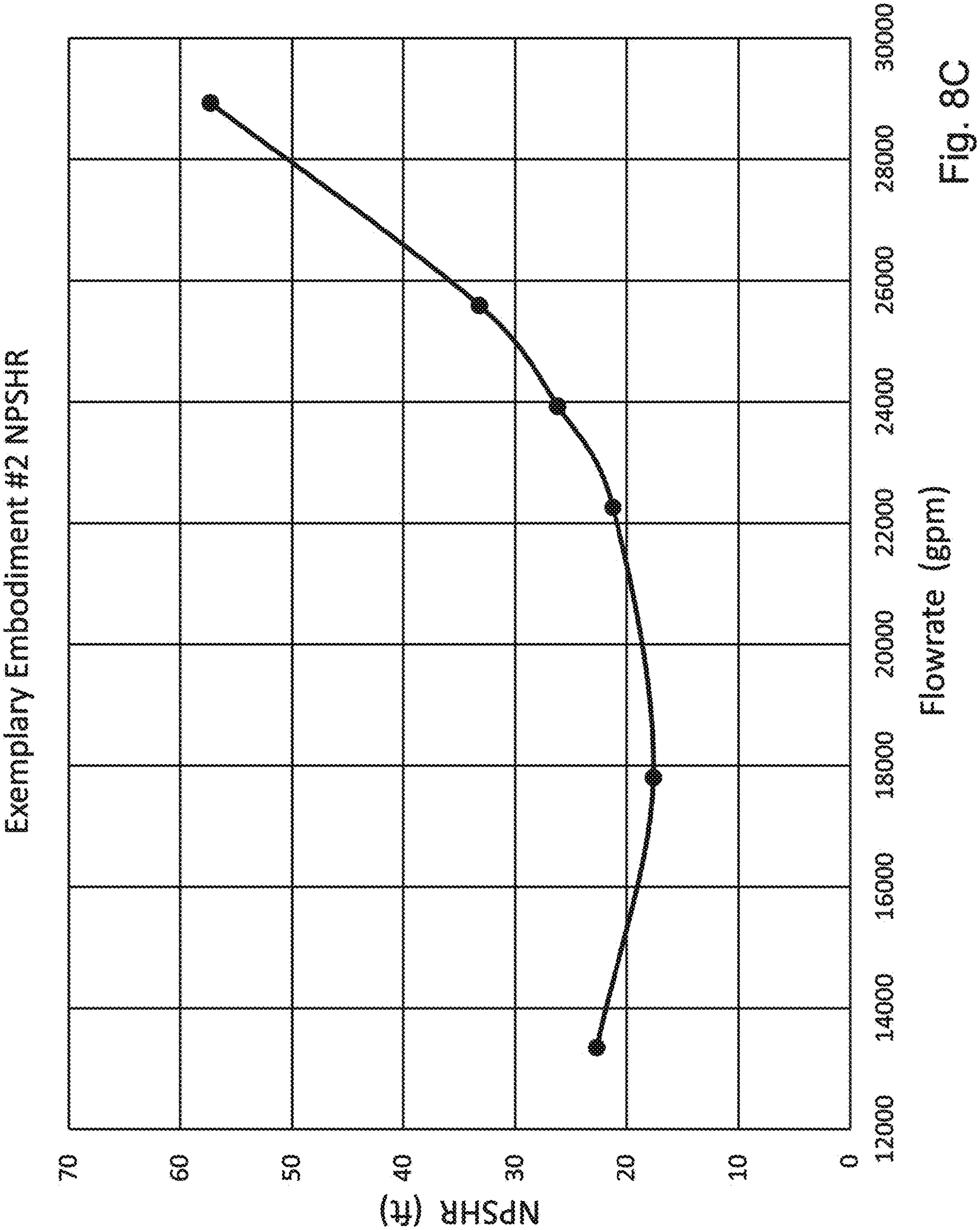
FIG. 8C is a graph that presents the NPSHR vs. flowrate curve of the second exemplary embodiment.

FIGS. 6A and 6B are side and front views, respectively, of a second exemplary embodiment of the present invention 600 for which the blades 602 are configured to rotate in a direction that is opposite to the first exemplary embodiment. With reference to FIG. 7, the head vs. flowrate curve for the second exemplary embodiment is substantially the same as in FIG. 3 for the first exemplary embodiment. FIGS. 8A-8C are graphs that present the efficiency, power, and required net positive suction head (NPSHR), respectively, for the second exemplary embodiment.

Figure 1F:
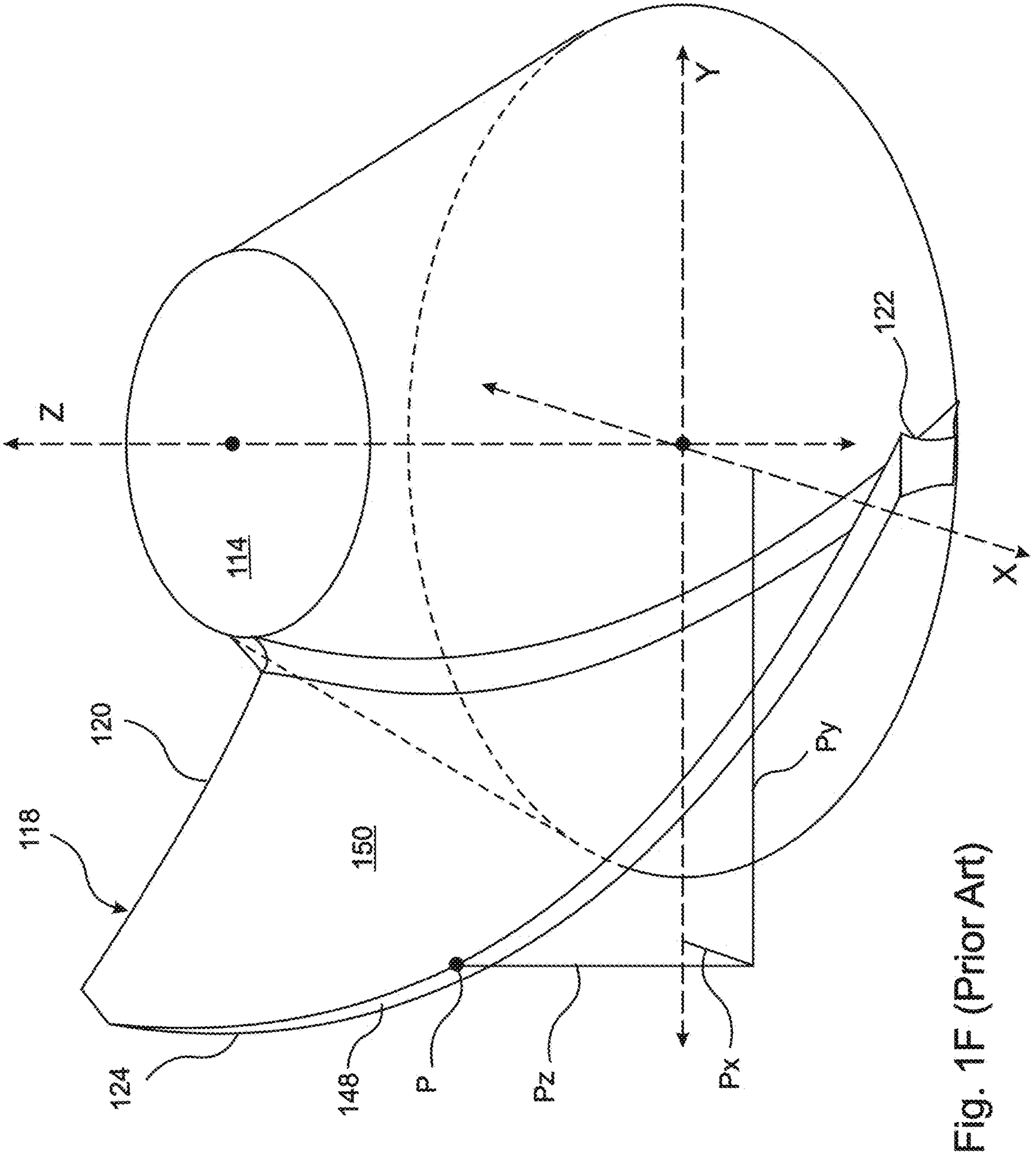
Fig. 1F (Prior Art)
FIG. 1F is a perspective view of the impeller of FIG. 1B in which only one of the blades is shown, and in which a standard Cartesian coordinate system is indicated.
Figure 1G:
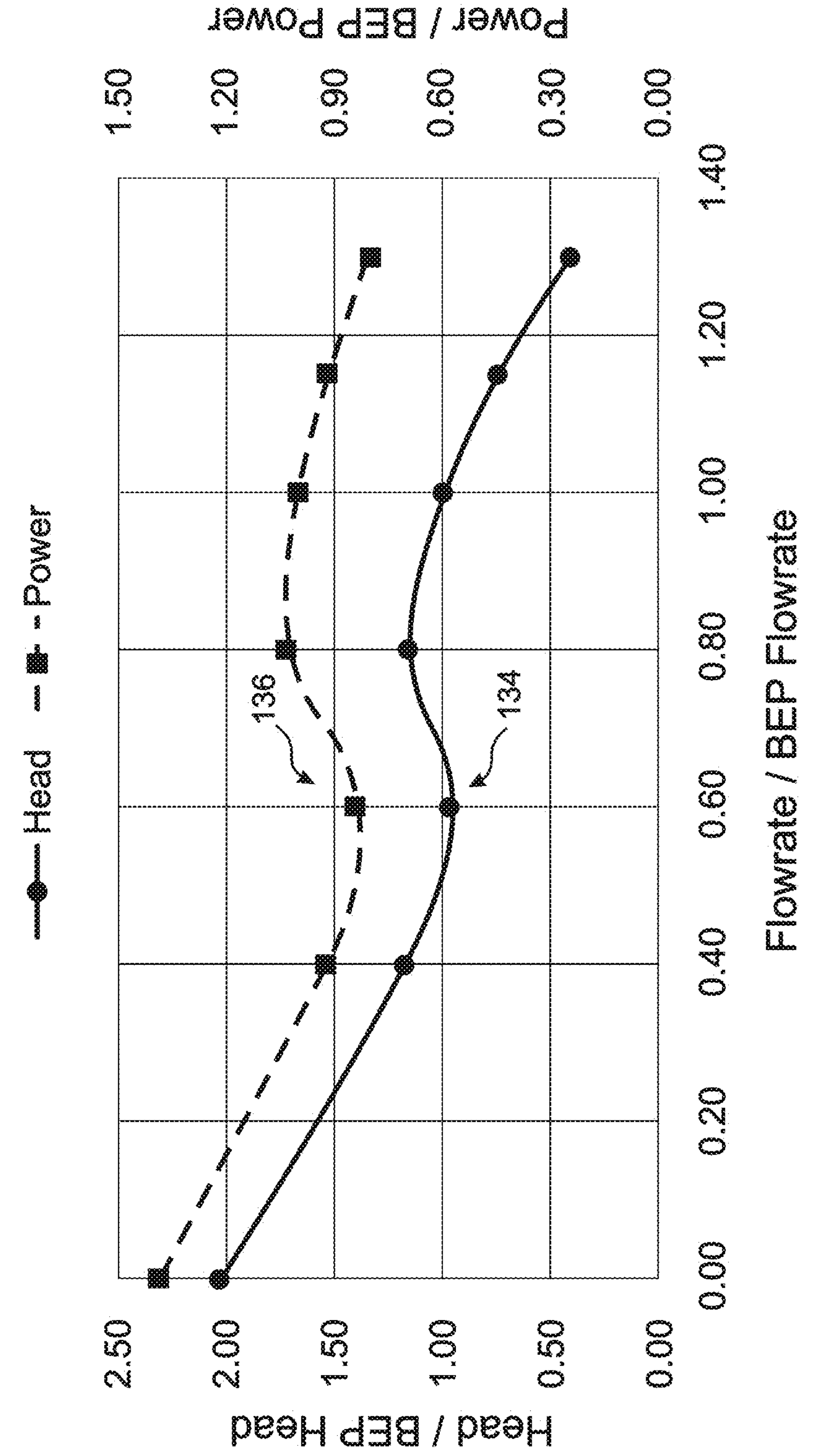
Fig. 1G (Prior Art)
FIG. 1G is a graph that presents head vs. flowrate and power vs. flowrate curves for a typical impeller of the prior art.

FIGS. 9A-9C are tables that fully characterize the blade shape of the first exemplary embodiment by reporting blade normal and tangential thicknesses, as well as locations, and blade angles on the pressure and suction sides for points along the shroud, mean, and hub streamlines, respectively. In the tables, data is presented for each of a plurality of equally spaced points along each streamline, having locations along the streamline expressed as percentages between the trailing edge (TE=100%) and the leading edge (LE=0%). In addition to the X, Y, and Z locations of the points, which are reported in mm according to the coordinate system illustrated in FIG. 1F, blade angles theta at the selected locations are also recited, as well as the normal and tangential thicknesses of the blade. While some parameter values are reported in mm in the tables, it will be understood that that the indicated dimensions are intended to be relative and exemplary, and that the dimensionality of the embodiment can be scaled as needed according to the requirements of a specific application.

Each of the blade angle curves for the first exemplary embodiment can be characterized by the following equation:

$$Y=ax^3+bx^2+cx+d \tag{1}$$

where Y is the blade angle, in degrees, x is the meridional length location along the streamline (in mm), and a, b, c, and d are constants. For presentation on a graph, the coordinates X along the x-axis in units of percentage can be obtained by dividing x by the total meridional length M of the streamline. According to equation (1), the hub blade angle curve for the first exemplary embodiment is defined by a=−6.9E−06, b=0.001913, c=−0.0925, d=42, and M=200 mm. Accordingly, 100% on the X-axis of the hub streamline curve of FIG. 4A is equivalent to x=200 in equation (1).

Similarly, for the mean streamline of the first exemplary embodiment, a=−6.2E−06, b−0.001736, c=−0.05057, d=26, and M=207 mm. And for the shroud streamline of the first exemplary embodiment, a=3.54E−08, b=−0.00032, c=0.100452, d=18, and M=218 mm.

FIGS. 10A-10C are tables that fully characterize the blade shape of the second exemplary embodiment by reporting the same parameters as in FIGS. 9A-9C. Equation (1) also applies to the blade angle curves for the second exemplary embodiment. For the hub streamline, a=−5.83−06, b=0.001434, c=−0.05676, d=42, and M=191 mm. For the mean streamline, a=−5.8E−06, b=0.001308, c=0.001018, d=26, and M=187 mm. For the shroud streamline, a=−6.8E−07, b=−0.0002, c=0.099075, d=18, and M=186 mm.

Figure 11:
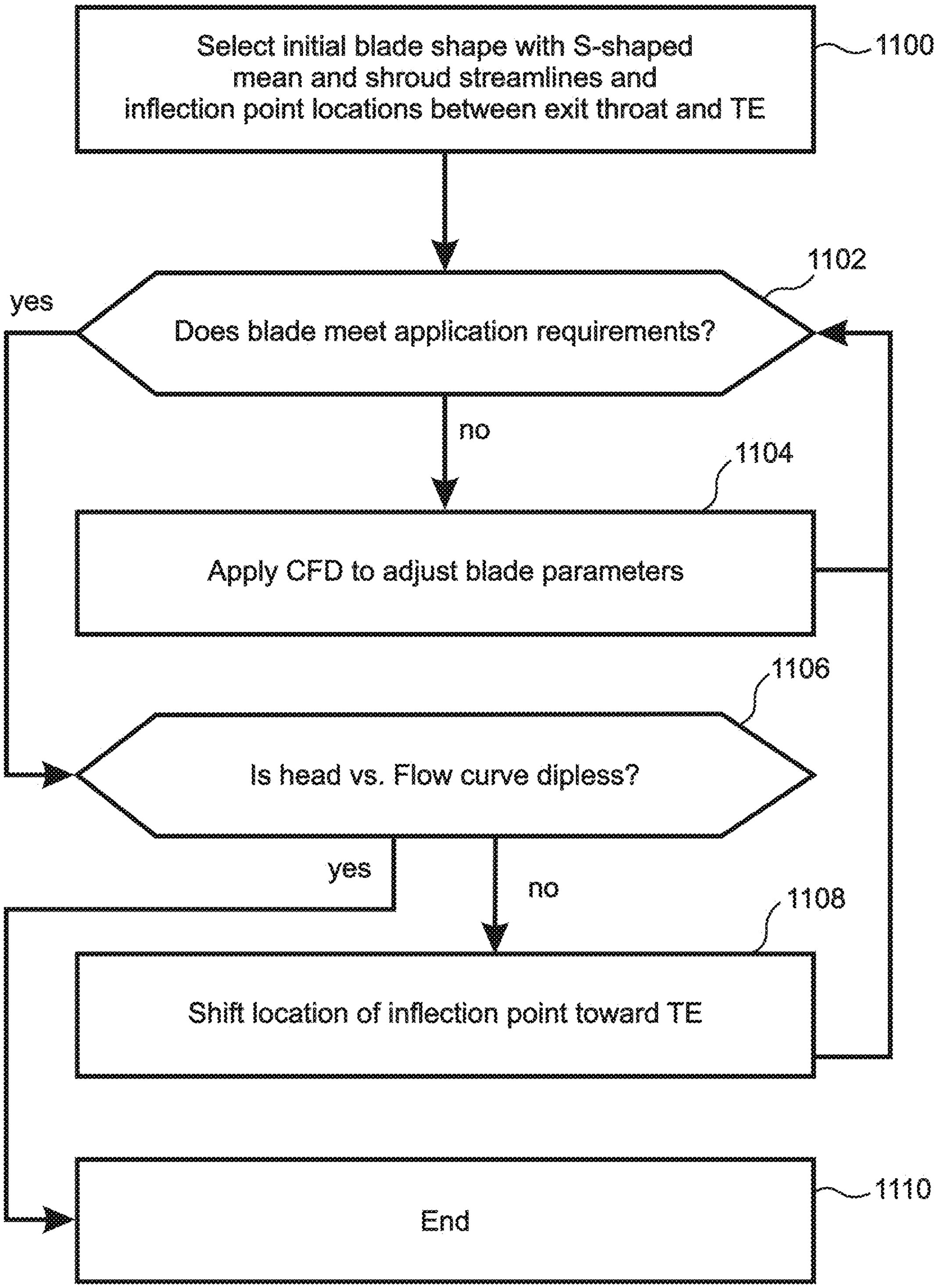
FIG. 11 is a flow diagram that illustrates a method embodiment of the present invention.

FIG. 11 is a flow diagram that illustrates a method embodiment of the present invention for designing a “dip-less” VCT impeller suitable for a given application, i.e. a VCT impeller suitable for implementation in a specified VCT pump design that will provide a head vs. flow curve that is monotonic. The method comprises selecting a candidate blade shape having S-shaped shroud and mean streamlines, wherein the inflection points of the shroud and mean streamlines are between the exit throat and the trailing blade edge 1100. In embodiments, the initial inflection points are chosen to be near the exit throat. CFD analysis is then used to determine whether the selected candidate blade shape meets the requirements of the application 1102. If not, then the parameters of the candidate blade shape are varied until CFD indicates that the candidate design does meet the requirements of the application 1104.

Once a candidate blade shape has been determined that meets the requirements of the application, CFD analysis is further applied to determine if the head vs. flow curve includes a “dip,” i.e. is not monotonic 1106. If there is a dip in the curve, then the inflection point of at least one of the shroud and/or mean streamlines is moved to a different location between the exit throat and the trailing edge 1108. The steps of applying CFD to determine if the blade meets the requirements of the application 1104 and if the head vs. flow curve is monotonic 1106 are then repeated, until a blade shape is found that satisfies both of these requirements 1110.

In similar embodiments, rather than stopping as soon as a dip-less blade shape is identified, this process proceeds until an optimal blade shape is determined. For example, there may be ranges of inflection point locations on the mean and shroud streamlines for which the minimum requirements of the application are met and the head vs. flow curve is monotonic. In some of these embodiments, the blade performance is compared over these ranges of “dip-less” inflection point locations, and the optimal blade shape is selected, i.e. the blade shape that provides the highest efficiency, the most power, and/or the best NPSHR.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the disclosure is not limited to just these forms, but is amenable to various changes and modifications. The present application does not explicitly recite all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

What is claimed is:

1. A vertical circulating turbine (VCT) pump configured to vertically pump a process fluid, the VCT comprising a shroudless impeller configured to be rotated about a vertical axis within a pump casing;

wherein the impeller comprises:

a central hub; and a plurality of identical impeller blades equally spaced about and extending radially outward from the central hub, each of the blades comprising:

a pressure side configured to apply pressure to a fluid when the impeller is rotated; and a suction side opposite the pressure side;

each of the pressure side and the suction side comprising:

a leading edge (LE) of the blade adjoining an inlet throat of the impeller;

a trailing edge (TE) of the blade adjoining an exit throat of the impeller;

a shroud streamline defined by a radially outward edge of the blade side, the shroud streamline having a shroud meridional length extending from the leading edge to the trailing edge;

a hub streamline defined by a radially inward edge of the blade side coincident with a juncture of the blade side with the hub, the hub streamline having a hub meridional length extending from the leading edge to the trailing edge; and a mean streamline having a mean meridional length extending from the leading edge to the trailing edge, the mean streamline being equally spaced between the shroud and hub streamlines;

wherein all of the shroud streamlines and the mean streamlines are S-shaped, having blade angles that increase from the leading edge to an inflection point and decrease from the inflection point to the trailing edge, or having blade angles that decrease from the leading edge to an inflection point and increase from the inflection point to the trailing edge; and wherein all of the inflection points on all of the shroud and mean streamlines are between the exit throat and the trailing edge; and the blade further comprising a shroud side extending between the pressure side shroud streamline and the suction side shroud streamline;

the inflection points being provided on the shroud and mean streamlines at locations that minimize or eliminate discharge recirculation on the shroud sides of the impeller blades when the impeller is rotated within the pump casing, thereby causing the VCT pump to provide a monotonically decreasing head as a function of a flow rate of the process fluid over a range of flow rates of the process fluid from zero flow to a flow rate that is beyond a best efficiency point (BEP) flow rate of the VCT pump.

2. The VCT pump of claim 1, wherein the VCT pump is able to provide flow rates from zero to 30,000 gallons-per-minute (gpm).

3. The VCT pump of claim 1, wherein the VCT pump is able to provide the monotonically decreasing head as a function of a flow rate of the process fluid over a range of flow rates of the process fluid from zero flow to a flow rate that is above 120% of the BEP flow rate.

4. The VCT pump of claim 1, wherein for each of the blades the blade angle curves of the shroud, mean, and hub streamlines on the pressure side are substantially identical to the blade angle curves of the shroud, mean, and hub streamlines on the suction side, respectfully.

5. The VCT pump of claim 4, wherein:

the blade angle curves of the shroud, mean, and hub streamlines are characterized by the equation $Y=ax^3+bx^2+cx+d$, where Y is the blade angle, in degrees, x is the meridional length location along the streamline (in mm), and a, b, c, and d are constants; and for each of the blade angle curves, meridional length locations X along the streamline in units of percentage of the total meridional length are equal to x divided by the total meridional length M of the streamline.

6. The VCT pump of claim 5, wherein:

for the shroud streamline blade angle curve, a=3.54E−08, b=−0.00032, c=0.100452, d=18, and M=218 mm;

for the hub streamline blade angle curve, a=−6.9E−06, b=0.001913, c=−0.0925, d=42, and M=200 mm; and for the mean streamline blade angle curve, a=−6.2E−06, b−0.001736, c=−0.05057, d=26, and M=207 mm.

7. The VCT pump of claim 5, wherein:

for the shroud streamline blade angle curve, a=−6.8E−07, b=−0.0002, c=0.099075, d=18, and M=186 mm;

for the hub streamline blade angle curve, a=−5.83−06, b=0.001434, c=−0.05676, d=42, and M=191 mm; and for the mean streamline blade angle curve, a=−5.8E−06, b=0.001308, c=0.001018, d=26, and M=187 mm.

8. A method of designing a VCT pump configured to meet specified requirements of a VCT pump application by vertically pumping a process fluid, while providing a monotonically decreasing head as a function of a flow rate of the process fluid over a range of flow rates of the process fluid from zero flow to a flow rate that is beyond a best efficiency point (BEP) flow rate of the VCT pump, the method comprising:

A) determining an initial candidate pump design having an initial candidate impeller design, the candidate impeller design comprising a plurality of identical blades equally spaced about, and extending radially outward from, a central hub, each of the blades having a candidate blade shape comprising a pressure blade side and a suction blade side, each of the pressure and suction blade sides comprising a plurality of streamlines extending from a leading edge thereof to a trailing edge thereof, the plurality of streamlines comprising a shroud streamline at a radially outward edge of the blade side, a hub streamline along a radially inward edge of the blade side, and a mean streamline equally spaced apart from the shroud and hub streamlines, wherein all of the shroud streamlines and the mean streamlines are S-shaped, having blade angles that increase from the leading edge to an inflection point and decrease from the inflection point to the trailing edge, or having blade angles that decrease from the leading edge to an inflection point and increase from the inflection point to the trailing edge; and wherein all of the inflection points on all of the shroud and mean streamlines are between the exit throat and the trailing edge;

B) determining whether the candidate pump design meets all of the specified requirements of the VCT pump application by applying computational fluid dynamics (CFD) to the candidate impeller design, and if not then modifying the candidate impeller design and repeating step B);

C) if the candidate pump design meets all of the specified requirements of the VCT pump application, applying CFD to determine if a head vs flow rate curve of the candidate pump design is monotonic from zero flow to a flow rate that is beyond a best efficiency point (BEP) flow rate of the candidate pump design, and if not, then moving at least one of the inflection points of the shroud and mean streamlines of the candidate impeller design to a different location between the exit gate and the trailing edge, and repeating steps B) and C) until a successful VCT pump design is identified.

9. The method of claim 8, wherein the method further comprises repeating steps A), B), and C) until an optimal VCT pump design is identified that provides optimal performance for the VCT pump application.

10. The method of claim 9, wherein the optimal VCT pump design causes the VCT pump to provide at least one of:

maximum power;

highest energy efficiency; and lowest required net positive suction head (NPSHR).

11. The method of claim 8, wherein the successful VCT pump design is able to provide flow rates from zero to 30,000 gallons-per-minute (gpm).

12. The method of claim 8, wherein the successful VCT pump design is able to provide the monotonically decreasing head as a function of a flow rate of the process fluid over a range of flow rates of the process fluid from zero flow to a flow rate that is above 120% of the BEP flow rate.

13. The method of claim 8, wherein for each of the blades of each blade of each of the candidate impeller designs, the blade angle curves of the shroud, mean, and hub streamlines on the pressure side are substantially identical to the blade angle curves of the shroud, mean, and hub streamlines on the suction side, respectfully.

14. The method of claim 13, wherein:

the blade angle curves of all of the shroud, mean, and hub streamlines of all of the candidate impeller designs are characterized by the equation $Y=ax^3+bx^2+cx+d$, where Y is the blade angle, in degrees, x is the meridional length location along the streamline (in mm), and a, b, c, and d are constants; and for each of the blade angle curves, meridional length locations X along the streamline in units of percentage of the total meridional length are equal to x divided by the total meridional length M of the streamline.

15. The method of claim 14, wherein:

for all of the shroud streamline blade angle curves, a=3.54E−08, b=−0.00032, c=0.100452, d=18, and M=218 mm;

for all of the hub streamline blade angle curves, a=−6.9E−06, b=0.001913, c=−0.0925, d=42, and M=200 mm; and for all of the mean streamline blade angle curves, a=−6.2E−06, b−0.001736, c=−0.05057, d=26, and M=207 mm.

16. The method of claim 14, wherein:

for all of the shroud streamline blade angle curves, a=−6.8E−07, b=−0.0002, c=0.099075, d=18, and M=186 mm;

for all of the hub streamline blade angle curves, a=−5.83−06, b=0.001434, c=−0.05676, d=42, and M=191 mm; and for all of the mean streamline blade angle curves a=−5.8E−06, b=0.001308, c=0.001018, d=26, and M=187 mm.

* * * * *